(12) United States Patent
Holt

(10) Patent No.: US 7,707,179 B2
(45) Date of Patent: Apr. 27, 2010

(54) MULTIPLE COMPUTER ARCHITECTURE WITH SYNCHRONIZATION

(75) Inventor: John Matthew Holt, Lindfield (AU)

(73) Assignee: Waratek Pty Limited, Lindfield, New South Wales (AU)

(*) Notice: Subject to any disclaimer, the term of this patent is extended or adjusted under 35 U.S.C. 154(b) by 691 days.

(21) Appl. No.: 11/111,779

(22) Filed: Apr. 22, 2005

(65) Prior Publication Data

US 2006/0020913 A1    Jan. 26, 2006

Related U.S. Application Data

(63) Continuation-in-part of application No. 10/830,042, filed on Apr. 23, 2004.

(51) Int. Cl.
*G06F 17/30* (2006.01)

(52) U.S. Cl. .................. 707/620; 707/626; 710/244

(58) Field of Classification Search .......... 710/200; 711/141; 709/248; 707/1, 8; 714/244
See application file for complete search history.

(56) References Cited

U.S. PATENT DOCUMENTS

| | | | |
|---|---|---|---|
| 4,969,092 A | 11/1990 | Shorter | |
| 5,214,776 A | 5/1993 | Bagnoli et al. | |
| 5,291,597 A | 3/1994 | Shorter | |
| 5,418,966 A * | 5/1995 | Madduri | 710/200 |
| 5,434,994 A | 7/1995 | Shaheen et al. | |
| 5,488,723 A | 1/1996 | Baradel et al. | |
| 5,544,345 A | 8/1996 | Carpenter et al. | |
| 5,568,609 A | 10/1996 | Sugiyama et al. | |
| 5,612,865 A | 3/1997 | Dasgupta | |
| 5,802,585 A * | 9/1998 | Scales et al. | 711/154 |
| 5,918,248 A | 6/1999 | Newell et al. | |
| 6,049,809 A | 4/2000 | Raman et al. | |
| 6,148,377 A | 11/2000 | Carter et al. | |
| 6,163,801 A | 12/2000 | O'Donnell et al. | |
| 6,192,514 B1 | 2/2001 | Lurndal | |
| 6,314,558 B1 | 11/2001 | Angel et al. | |
| 6,324,587 B1 | 11/2001 | Trenbeath et al. | |

(Continued)

FOREIGN PATENT DOCUMENTS

EP    0969377    1/2000

(Continued)

OTHER PUBLICATIONS

Orca: Alanguage for Parallel Programming of Distributed Systems, Dec. 6, 1999, pp. 190-205.*

(Continued)

*Primary Examiner*—John R. Cottingham
*Assistant Examiner*—Sherief Badawi
(74) *Attorney, Agent, or Firm*—Pillsbury Winthrop Shaw Pittman LLP

(57) ABSTRACT

The present invention discloses a modified computer architecture (50, 71, 72) which enables an applications program (50) to be run simultaneously on a plurality of computers (M1, ... Mn). Shared memory at each computer is updated with amendments and/or overwrites so that all memory read requests are satisfied locally. During initial program loading (75), or similar, instructions which result in the application program (50) acquiring (or releasing) a lock on a particular asset (50A, 50X-50Y) (synchronization) are identified. Additional instructions are inserted (162, 163) to result in a modified synchronization routine with which all computers are updated.

37 Claims, 15 Drawing Sheets

U.S. PATENT DOCUMENTS

| | | | |
|---|---|---|---|
| 6,327,630 | B1 | 12/2001 | Carroll et al. |
| 6,370,625 | B1 | 4/2002 | Carmean et al. |
| 6,389,423 | B1 | 5/2002 | Sakakura |
| 6,425,016 | B1 | 7/2002 | Banavar et al. |
| 6,571,278 | B1 | 5/2003 | Negishi et al. |
| 6,574,628 | B1 | 6/2003 | Kahn et al. |
| 6,574,674 | B1 | 6/2003 | Mairs et al. |
| 6,611,955 | B1 | 8/2003 | Logean et al. |
| 6,625,751 | B1 | 9/2003 | Starovic et al. |
| 6,668,260 | B2 | 12/2003 | Zoltan |
| 6,757,896 | B1 | 6/2004 | Cohen et al. |
| 6,760,903 | B1* | 7/2004 | Morshed et al. ............. 717/130 |
| 6,775,831 | B1 | 8/2004 | Carrasco et al. |
| 6,779,093 | B1 | 8/2004 | Gupta |
| 6,782,492 | B1 | 8/2004 | Nakaso |
| 6,823,511 | B1 | 11/2004 | McKenney et al. |
| 6,862,608 | B2* | 3/2005 | Buhlman et al. ............. 709/213 |
| 6,954,794 | B2 | 10/2005 | Rudd et al. |
| 6,968,372 | B1 | 11/2005 | Thompson et al. |
| 7,010,576 | B2 | 3/2006 | Bae |
| 7,020,736 | B1 | 3/2006 | Cherukuri |
| 7,031,989 | B2 | 4/2006 | Elmendorf et al. |
| 7,047,341 | B2 | 5/2006 | Jung |
| 7,047,521 | B2 | 5/2006 | Bunnell |
| 7,058,826 | B2 | 6/2006 | Fung |
| 7,082,604 | B2 | 7/2006 | Schneiderman |
| 7,206,827 | B2 | 4/2007 | Viswanath et al. |
| 2002/0199172 | A1 | 12/2002 | Bunnell |
| 2003/0004924 | A1* | 1/2003 | Williams ........................ 707/1 |
| 2003/0005407 | A1 | 1/2003 | Hines |
| 2003/0067912 | A1 | 4/2003 | Mead et al. |
| 2003/0105816 | A1 | 6/2003 | Goswani |
| 2004/0073828 | A1 | 4/2004 | Bronstein |
| 2004/0093588 | A1 | 5/2004 | Gschwind et al. |
| 2004/0158819 | A1 | 8/2004 | Cuomo et al. |
| 2004/0163077 | A1 | 8/2004 | Dimpsey et al. |
| 2005/0039171 | A1 | 2/2005 | Avakian et al. |
| 2005/0086384 | A1* | 4/2005 | Ernst .......................... 709/248 |
| 2005/0108481 | A1* | 5/2005 | Iyengar et al. ............... 711/141 |
| 2005/0240737 | A1 | 10/2005 | Holt |
| 2005/0257219 | A1 | 11/2005 | Holt |
| 2005/0262313 | A1 | 11/2005 | Holt |
| 2005/0262513 | A1 | 11/2005 | Holt |
| 2006/0020913 | A1 | 1/2006 | Holt |
| 2006/0080389 | A1 | 4/2006 | Powers et al. |
| 2006/0095483 | A1 | 5/2006 | Holt |
| 2006/0143350 | A1* | 6/2006 | Miloushev et al. .......... 710/242 |
| 2006/0167878 | A1* | 7/2006 | Hartman ........................ 707/8 |
| 2006/0242464 | A1 | 10/2006 | Holt |
| 2006/0253844 | A1 | 11/2006 | Holt |
| 2006/0265703 | A1 | 11/2006 | Holt |
| 2006/0265704 | A1 | 11/2006 | Holt |
| 2006/0265705 | A1 | 11/2006 | Holt |
| 2008/0072238 | A1 | 3/2008 | Monnie et al. |
| 2008/0189700 | A1 | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO-02/44835 A2 | 6/2002 |
| WO | WO03/083614 | 10/2003 |
| WO | WO-03/083614 A2 | 10/2003 |
| WO | WO03084116 | 10/2003 |
| WO | WO2005/103924 | 11/2005 |
| WO | WO-2005/103924 | 11/2005 |
| WO | WO2005/103925 | 11/2005 |
| WO | WO-2005/103925 | 11/2005 |
| WO | WO2005/103926 | 11/2005 |
| WO | WO-2005/103926 A1 | 11/2005 |
| WO | WO2005/103927 | 11/2005 |
| WO | WO-2005/103927 | 11/2005 |
| WO | WO2005/103928 | 11/2005 |
| WO | WO-2005/103928 | 11/2005 |
| WO | WO2006/110937 | 10/2006 |
| WO | WO2006/110957 | 10/2006 |

OTHER PUBLICATIONS

Bal et al., "Object Distribution in Orca Using Compile-Time and Run-Time Techniques", Proc. Conference on Object-Oriented Programming Systems, Languages and Application, pp. 162-177, Sep. 1993.

Bressoud, "TFT: A Software System For Application-Transparent Fault Tolerance", Proc. 28th Annual International Symposium on Fault-Tolerant Computing, pp. 128-137, 1998.

Bal et al., "Orca: A Language For Parallel Programming of Distributed Systems", IEEE Transactions on Software Engineering, vol. 18, No. 3, pp. 190-205, Mar. 1992.

Bal et al., "Replication Techniques For Speeding Up Parallel Applications on Distributed Systems", Concurrency Practice & Experience, vol. 4, No. 5, pp. 337-355, Aug. 1992.

Bal et al., "A Distributed Implementation of the Shared Data-Object Model", Proc. USENIX Workshop on Experiences with Distributed and Multiprocessor Systems, pp. 1-19, Oct. 1989.

Gothe et al., "The Distributed Ada Run-time System DARTS", Software-Practice and Experience, vol. 21, No. 1, Nov. 1991, pp. 1249-1263.

Bennett et al., "Munin: Distributed Shared Memory Based on Type-Specific Memory Coherence", Dept. of Elec. and Computer Engineering, pp. 1-9.

Dwarkadas et al., "Evaluation of Release Consistent Softwared Distributed Shared Memory on Emerging Network Technology", Dept. of Computer Science, Rice University, pp. 1-12.

Russ et al., "The Hector Distributed Run-Time Environment", NSF Engineering Research Center, pp. 1-21.

Aridor et al., "cJVM: a Single System Image of aJVM on a Cluster", IBM Research Laboratory in Haifa.

da Silva et al., "An Evaluation of cJava System Architecture", IEEE, Proc. of 15th Symposium on Computer Architecture and High Performance Computing, 2003, pp. 1-9.

Haumacher, "Transparent distributed threads for Java," Parallel & Distributed Processing symposium, 2003. Proc. Int'l. pp. 22-26 (Apr. 2003).

Chen et al., "Multi-Jav: a distributed shared memory system based on multiple Java virtual machines." Proc. Of Conf. on Parallel & Distrib. Proc. Techn. & Appls. Las Vegas, NV, Jun. 1998.

Bellew, et al., "Update propagation in distributed memory hierarchy." Data Engr. 1990. Proc. 6th Int'l Conf. pp. 521-528, Feb. 1990.

Radovic, et al. "Removing the overhead from software-based shared memory." Prc. 2001 ACM/IEEE Conf. Supercomputing (CDrom) Denver CO Nov. 10-16, 2001. Supercomuting '01. ACM Press. NY.

Larus et al. "EEL: machine-independent executable editing. 1995 ACM SIGGPLAN '95." pp. 291-300.

Dmitriev. "Profiling Javas applications using code holswapping and dynamic call graph revelation." Jan. 2004 ACM WOSP '04. pp. 139-150.

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al., "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", *IEEE CS International Conference on Computer Languages*, pp. 1-23, Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al., "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", $28^{th}$ Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5- Retreived from the internet URL:http://www.springerlink.com/content/5v 028411810p6m700/>, vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplementary European Search Report EP 06 79 0317 Dated Mar. 5, 2009.

Bal et al., "Experience with Distributed Programming in Orca", Proc. IEEE CS International Conference on Computer Languages, pp. 79-89, Mar. 1990.

* cited by examiner

MULTIPLE COMPUTER ARCHITECTURE WITH SYNCHRONIZATION

FIELD OF THE INVENTION

The present invention relates to computers and, in particular, to a modified machine architecture which enables the operation of an application program simultaneously on a plurality of computers interconnected via a communications network.

BACKGROUND ART

Ever since the advent of computers, and computing, software for computers has been written to be operated upon a single machine. As indicated in FIG. 1, that single prior art machine 1 is made up from a central processing unit, or CPU, 2 which is connected to a memory 3 via a bus 4. Also connected to the bus 4 are various other functional units of the single machine 1 such as a screen 5, keyboard 6 and mouse 7.

A fundamental limit to the performance of the machine 1 is that the data to be manipulated by the CPU 2, and the results of those manipulations, must be moved by the bus 4. The bus 4 suffers from a number of problems including so called bus "queues" formed by units wishing to gain an access to the bus, contention problems, and the like. These problems can, to some extent, be alleviated by various stratagems including cache memory, however, such stratagems invariably increase the administrative overhead of the machine 1.

Naturally, over the years various attempts have been made to increase machine performance. One approach is to use symmetric multiple processors. This prior art approach has been used in so called "super" computers and is schematically indicated in FIG. 2. Here a plurality of CPU's 12 are connected to global memory 13. Again, a bottleneck arises in the communications between the CPU's 12 and the memory 13. This process has been termed "Single System Image". There is only one application and one whole copy of the memory for the application which is distributed over the global memory. The single application can read from and write to, (ie share) any memory location completely transparently.

Where there are a number of such machines interconnected via a network, this is achieved by taking the single application written for a single machine and partitioning the required memory resources into parts. These parts are then distributed across a number of computers to form the global memory 13 accessible by all CPU's 12. This procedure relies on masking, or hiding, the memory partition from the single running application program. The performance degrades when one CPU on one machine must access (via a network) a memory location physically located in a different machine.

Although super computers have been technically successful in achieving high computational rates, they are not commercially successful in that their inherent complexity makes them extremely expensive not only to manufacture but to administer. In particular, the single system image concept has never been able to scale over "commodity" (or mass produced) computers and networks. In particular, the Single System Image concept has only found practical application on very fast (and hence very expensive) computers interconnected by very fast (and similarly expensive) networks.

A further possibility of increased computer power through the use of a plural number of machines arises from the prior art concept of distributed computing which is schematically illustrated in FIG. 3. In this known arrangement, a single application program (Ap) is partitioned by its author (or another programmer who has become familiar with the application program) into various discrete tasks so as to run upon, say, three machines in which case n in FIG. 3 is the integer 3. The intention here is that each of the machines M1 . . . M3 runs a different third of the entire application and the intention is that the loads applied to the various machines be approximately equal. The machines communicate via a network 14 which can be provided in various forms such as a communications link, the internet, intranets, local area networks, and the like. Typically the speed of operation of such networks 14 is an order of magnitude slower than the speed of operation of the bus 4 in each of the individual machines M1, M2, etc.

Distributed computing suffers from a number of disadvantages. Firstly, it is a difficult job to partition the application and this must be done manually. Secondly, communicating data, partial results, results and the like over the network 14 is an administrative overhead. Thirdly, the need for partitioning makes it extremely difficult to scale upwardly by utilising more machines since the application having been partitioned into, say three, does not run well upon four machines. Fourthly, in the event that one of the machines should become disabled, the overall performance of the entire system is substantially degraded.

A further prior art arrangement is known as network computing via "clusters" as is schematically illustrated in FIG. 4. In this approach, the entire application is loaded onto each of the machines M1, M2 . . . Mn. Each machine communicates with a common database but does not communicate directly with the other machines. Although each machine runs the same application, each machine is doing a different "job" and uses only its own memory. This is somewhat analogous to a number of windows each of which sell train tickets to the public. This approach does operate, is scalable and mainly suffers from the disadvantage that it is difficult to administer the network.

In computer languages such as JAVA and MICROSOFT.NET there are two major types of constructs with which programmers deal. In the JAVA language these are known as objects and classes. In any computer environment it is necessary to acquire and release a lock to enable the use of such assets, resources or structures to avoid different parts of the application program attempting to use the same resource at the one time. In the JAVA environment this is known as synchronization. This is achieved in JAVA by the "monitor enter" and "monitor exit" instructions or routines. Other languages use different terms but utilize a similar concept.

The present invention discloses a computing environment in which an application program operates simultaneously on a plurality of computers. In such an environment it is necessary to ensure that the "monitor enter" and "monitor exit" (more generally synchronization routines) operate in a consistent fashion across all the machines. It is this goal of consistent locking of resources that is the genesis of the present invention.

In accordance with a first aspect of the present invention there is disclosed a method multiple computer system having at least one application program running simultaneously on a plurality of computers interconnected by a communications network, wherein a like plurality of substantially identical objects are created, each in the corresponding computer and each having a substantially identical name, and said system including a lock means applicable to all said computers wherein any computer wishing to utilize a named object therein acquires an authorizing lock from said lock means which permits said utilization and which prevents all the other computers from utilizing their corresponding named object until said authorizing lock is relinquished.

In accordance with a second aspect of the present invention there is disclosed a plurality of computers interconnected via a communications link and operating at least one application program simultaneously wherein each said computer in operating said at least one application program utilizes an object only in local memory physically located in each said computer, the contents of the local memory utilized by each said computer is fundamentally similar but not, at each instant, identical, and every one of said computers has a an acquire lock routine and a release lock routine which permit utilization of the local object only by one computer if each of the remainder of said plurality of computers is locked out of utilization of their corresponding object.

In accordance with a third aspect of the present invention there is disclosed a method of running at least one application program on a plurality of computers simultaneously, said computers being interconnected by means of a communications network, said method comprising the steps of:

(i) creating a like plurality of substantially identical objects each in the corresponding computer and each having a substantially identical name, and (ii) requiring any of said computers wishing to utilize a named object therein to acquire an authorizing lock which permits said utilization and which prevents all the other computers from utilizing their corresponding named object until said authorizing lock is relinquished.

In accordance with a fourth aspect of the present invention there is disclosed a method of ensuring consistent synchronization of an application program to be run simultaneously on a plurality of computers interconnected via a communications network, said method comprising the steps of:

(i) scrutinizing said application program at, or prior to, or after loading to detect each program step defining an synchronization routine, and (ii) modifying said synchronization routine to ensure utilization by only one computer of an object and preventing all the remaining computers from simultaneously utilizing their corresponding objects.

In accordance with a fifth aspect of the present invention there is disclosed a multiple thread processing computer operation in which individual threads of a single application program are simultaneously being processed each on a corresponding one of a plurality of computers interconnected via a communications link, and in which objects in local memory physically associated with the computer processing each thread have corresponding objects in the local memory of each other said computer, the improvement comprising permitting only one of said computers to utilize an object and preventing all the remaining computers from simultaneously utilizing their corresponding object.

In accordance with a sixth aspect of the present invention there is disclosed a computer program product comprising a set of program instructions stored in a storage medium and operable to permit a plurality of computers to carry out the abovementioned methods.

BRIEF DESCRIPTION OF THE DRAWINGS

Embodiments of the present invention will now be described with reference to the drawings in which.

The specification includes Annexures A and D which provide actual program fragments which implement various aspects of the described embodiments. Annexure A relates to fields and Annexure D to synchronization.

DETAILED DESCRIPTION

Figure 5:
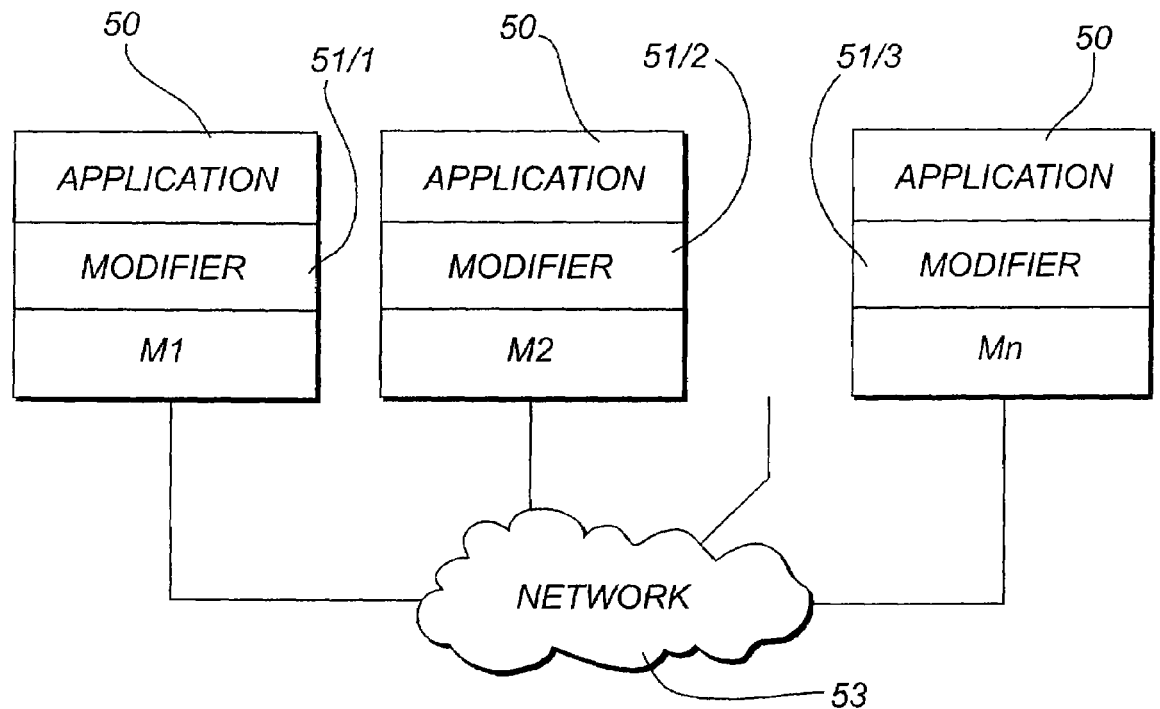
FIG. 5 is a schematic block diagram of a plurality of machines operating the same application program in accordance with a first embodiment of the present invention.

In connection with FIG. 5, in accordance with a preferred embodiment of the present invention a single application program 50 can be operated simultaneously on a number of machines M1, M2 . . . Mn communicating via network 53. As it will become apparent hereafter, each of the machines M1, M2 . . . Mn operates with the same application program 50 on each machine M1, M2 . . . Mn and thus all of the machines M1, M2 . . . Mn have the same application code and data 50. Similarly, each of the machines M1, M2 . . . Mn operates with the same (or substantially the same) modifier 51 on each machine M1, M2 . . . Mn and thus all of the machines M1, M2 . . . Mn have the same (or substantially the same) modifier 51 with the modifier of machine M2 being designated 51/2. In addition, during the loading of, or preceding the execution of, the application 50 on each machine M1, M2 . . . Mn, each application 50 has been modified by the corresponding modifier 51 according to the same rules (or substantially the same rules since minor optimising changes are permitted within each modifier 51/1 . . . 51/n).

As a consequence of the above described arrangement, if each of the machines M1, M2 . . . Mn has, say, a shared memory capability of 10 MB, then the total shared memory available to each application 50 is not, as one might expect, 10 n MB but rather only 10 MB. However, how this results in improved operation will become apparent hereafter. Naturally, each machine M1, M2 . . . Mn has an unshared memory capability. The unshared memory capability of the machines M1, M2 . . . Mn are normally approximately equal but need not be.

Figure 6:
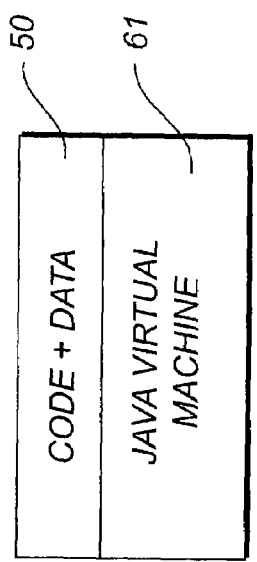
FIG. 6 is a schematic illustration of a prior art computer arranged to operate JAVA code and thereby constitute a JAVA virtual machine.

It is known from the prior art to operate a machine (produced by one of various manufacturers and having an operating system operating in one of various different languages) in a particular language of the application, by creating a virtual machine as schematically illustrated in FIG. 6. The prior art arrangement of FIG. 6 takes the form of the application 50 written in the Java language and executing within a Java Virtual Machine 61. Thus, where the intended language of the application is the language JAVA, a JAVA virtual machine is created which is able to operate code in JAVA irrespective of the machine manufacturer and internal details of the machine. For further details see "The JAVA Virtual Machine Specification" $2^{nd}$ Edition by T. Lindholm & F. Yellin of Sun Microsystems Inc. of the USA.

Figure 7:
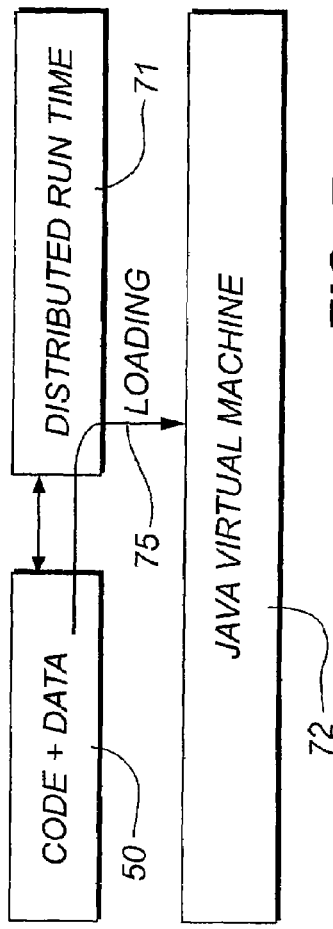
FIG. 7 is a drawing similar to FIG. 6 but illustrating the initial loading of code in accordance with the preferred embodiment.

This well known prior art arrangement of FIG. 6 is modified in accordance with the preferred embodiment of the present invention by the provision of an additional facility which is conveniently termed "distributed run time" or DRT 71 as seen in FIG. 7. In FIG. 7, the application 50 is loaded onto the Java Virtual Machine 72 via the distributed runtime system 71 through the loading procedure indicated by arrow 75. A distributed run time system is available from the Open Software Foundation under the name of Distributed Computing Environment (DCE). In particular, the distributed runtime 71 comes into operation during the loading procedure indicated by arrow 75 of the JAVA application 50 so as to initially create the JAVA virtual machine 72. The sequence of operations during loading will be described hereafter in relation to FIG. 9.

Figure 8:
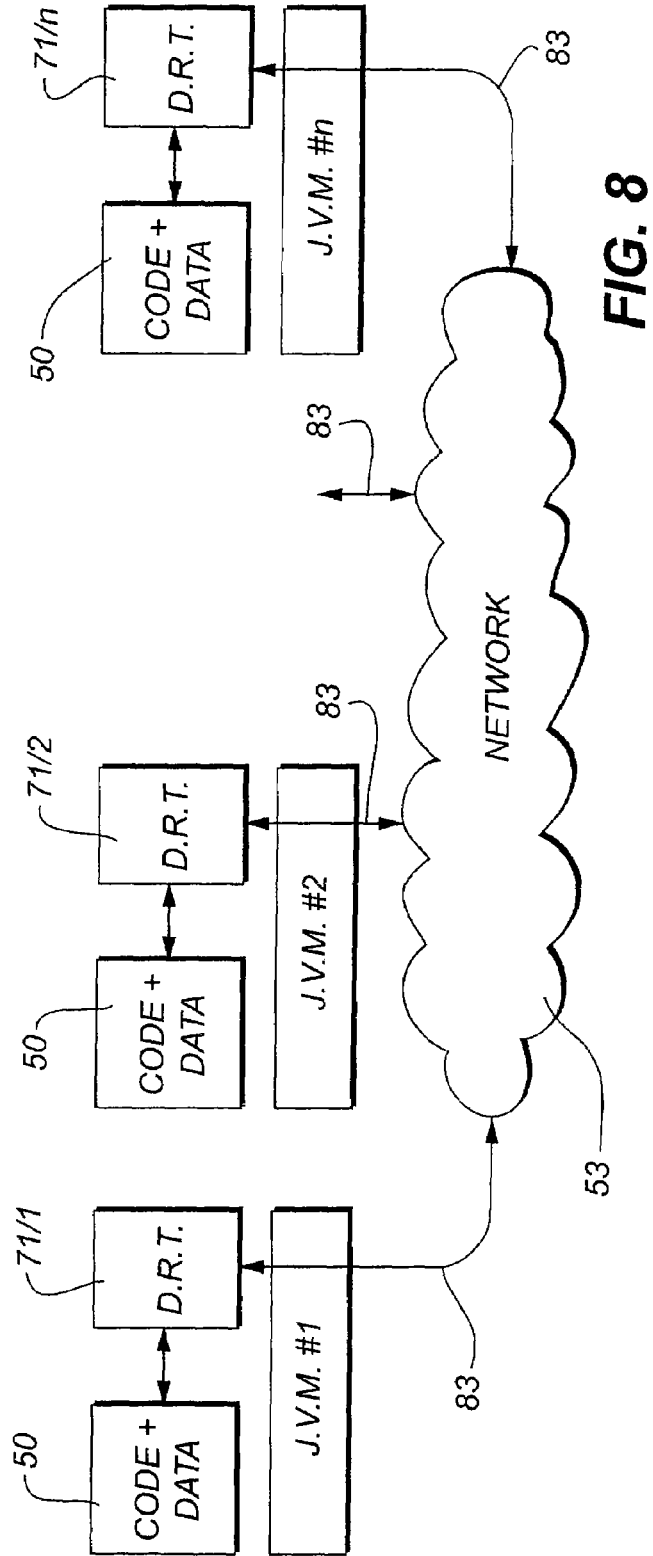
FIG. 8 is a drawing similar to FIG. 5 but illustrating the interconnection of a plurality of computers each operating JAVA code in the manner illustrated in FIG. 7.

FIG. 8 shows in modified form the arrangement of FIG. 5 utilising JAVA virtual machines, each as illustrated in FIG. 7. It will be apparent that again the same application 50 is loaded onto each machine M1, M2 . . . Mn. However, the communications between each machine M1, M2 . . . Mn, and indicated by arrows 83, although physically routed through the machine hardware, are controlled by the individual DRT's 71/1 . . . 71/n within each machine. Thus, in practice this may be conceptionalised as the DRT's 71/1 . . . 71/n communicating with each other via the network 73 rather than the machines M1, M2 . . . Mn themselves.

Figure 9:
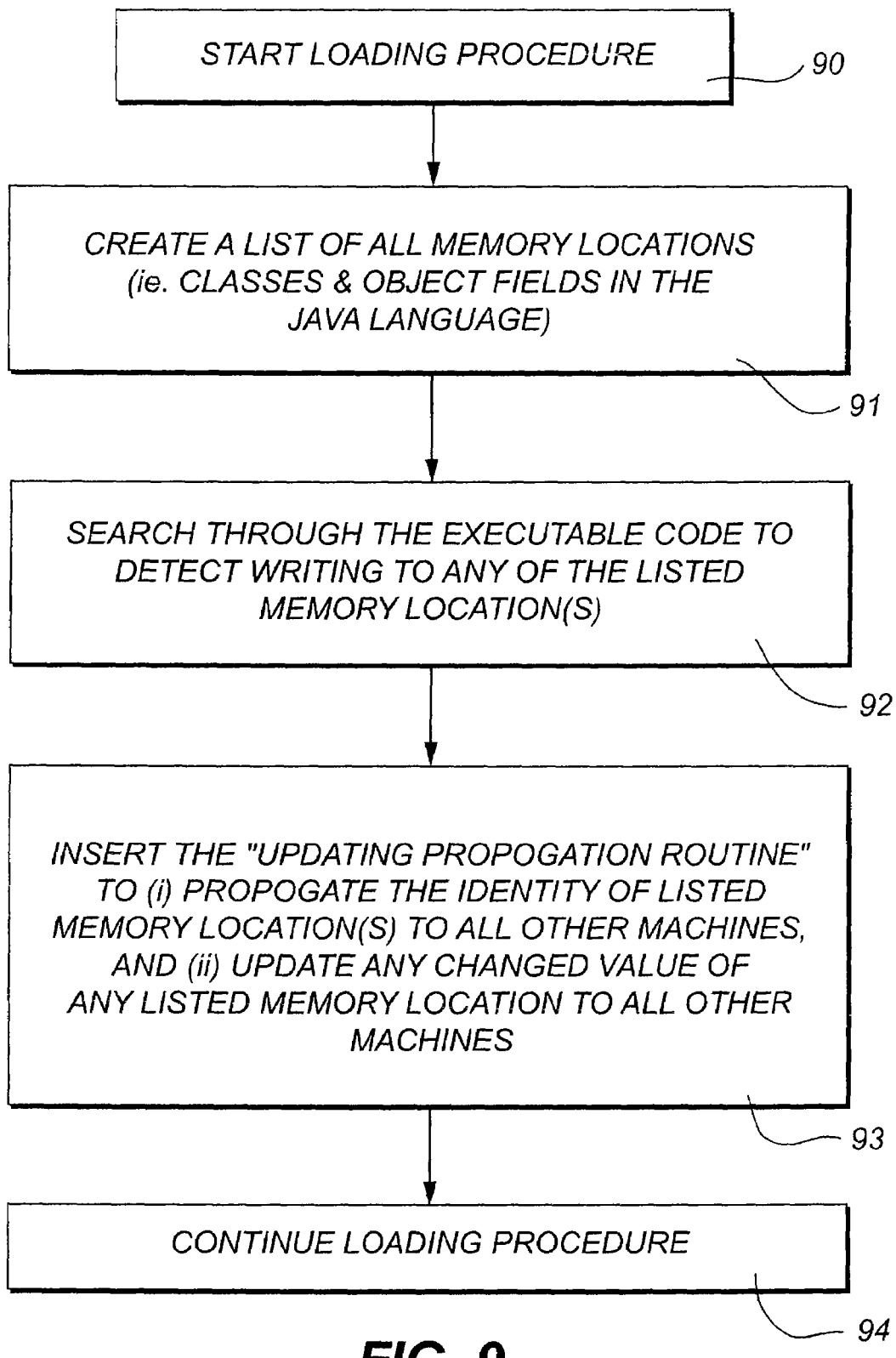
FIG. 9 is a flow chart of the procedure followed during loading of the same application on each machine in the network.

Turning now to FIGS. 7 and 9, during the loading procedure 75, the program 50 being loaded to create each JAVA virtual machine 72 is modified. This modification commences at 90 in FIG. 9 and involves the initial step 91 of detecting all memory locations (termed fields in JAVA—but equivalent terms are used in other languages) in the application 50 being loaded. Such memory locations need to be identified for subsequent processing at steps 92 and 93. The DRT 71 during the loading procedure 75 creates a list of all the memory locations thus identified, the JAVA fields being listed by object and class. Both volatile and synchronous fields are listed.

The next phase (designated 92 in FIG. 9) of the modification procedure is to search through the executable application code in order to locate every processing activity that manipulates or changes field values corresponding to the list generated at step 91 and thus writes to fields so the value at the corresponding memory location is changed. When such an operation (typically putstatic or putfield in the JAVA language) is detected which changes the field value, then an "updating propagation routine" is inserted by step 93 at this place in the program to ensure that all other machines are notified that the value of the field has changed. Thereafter, the loading procedure continues in a normal way as indicated by step 94 in FIG. 9.

Figure 10:
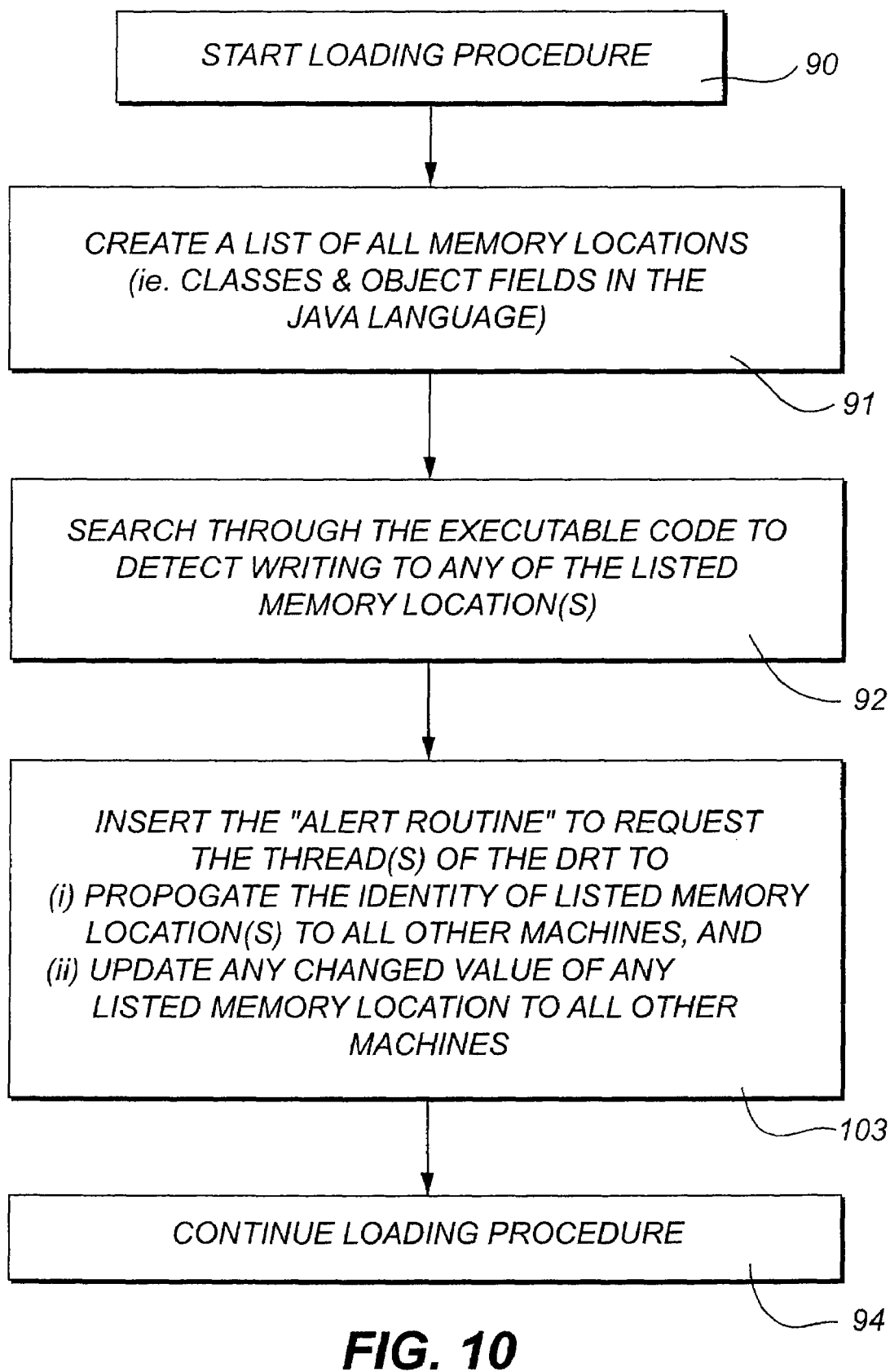
FIG. 10 is a flow chart showing a modified procedure similar to that of FIG. 9.

An alternative form of initial modification during loading is illustrated in FIG. 10. Here the start and listing steps 90 and 91 and the searching step 92 are the same as in FIG. 9. However, rather than insert the "updating propagation routine" as in step 93 in which the processing thread carries out the updating, instead an "alert routine" is inserted at step 103. The "alert routine" instructs a thread or threads not used in processing and allocated to the DRT, to carry out the necessary propagation. This step 103 is a quicker alternative which results in lower overhead.

Figure 11:
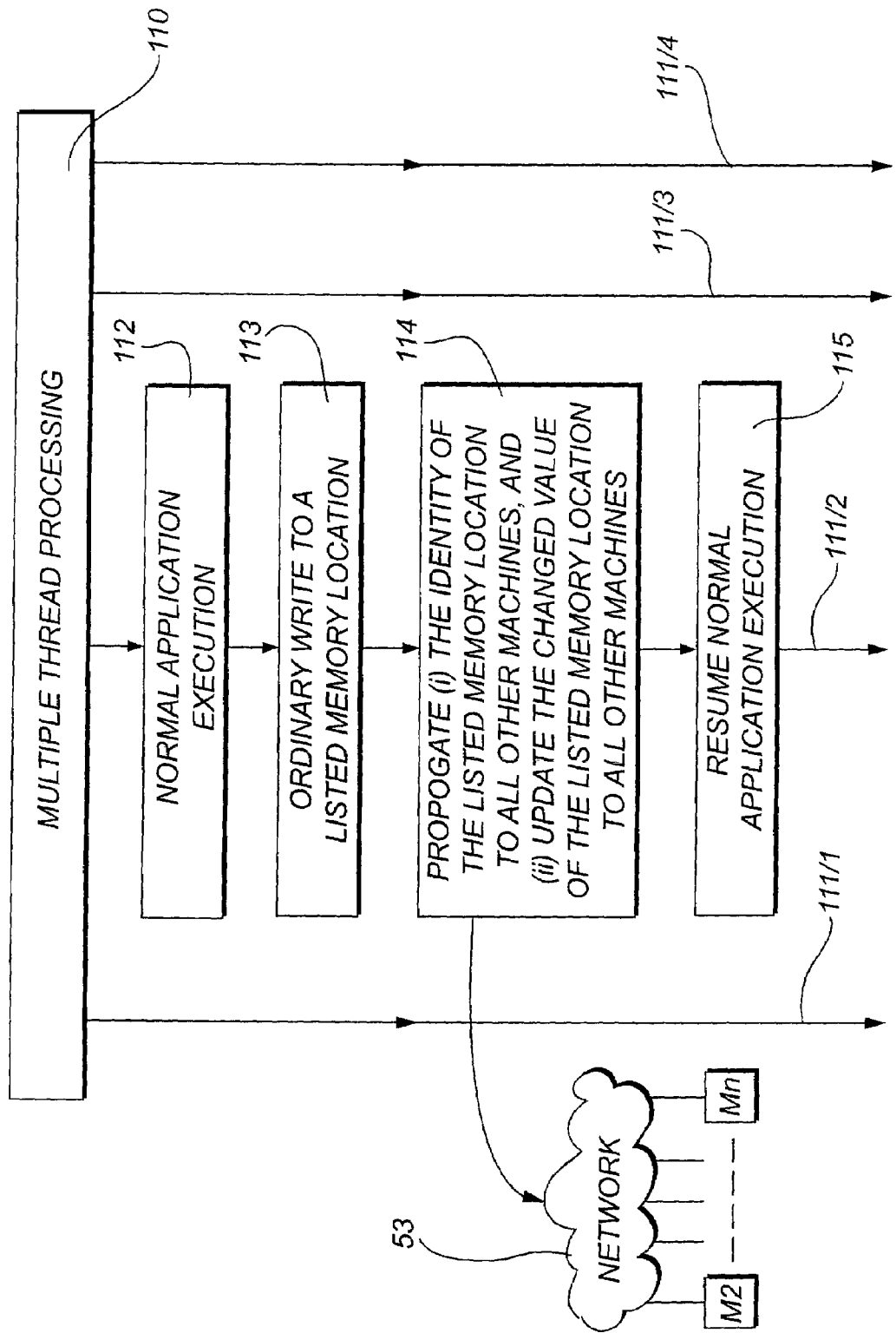
FIG. 11 is a schematic representation of multiple thread processing carried out on the machines of FIG. 8 utilizing a first embodiment of memory updating.
Figure 12:
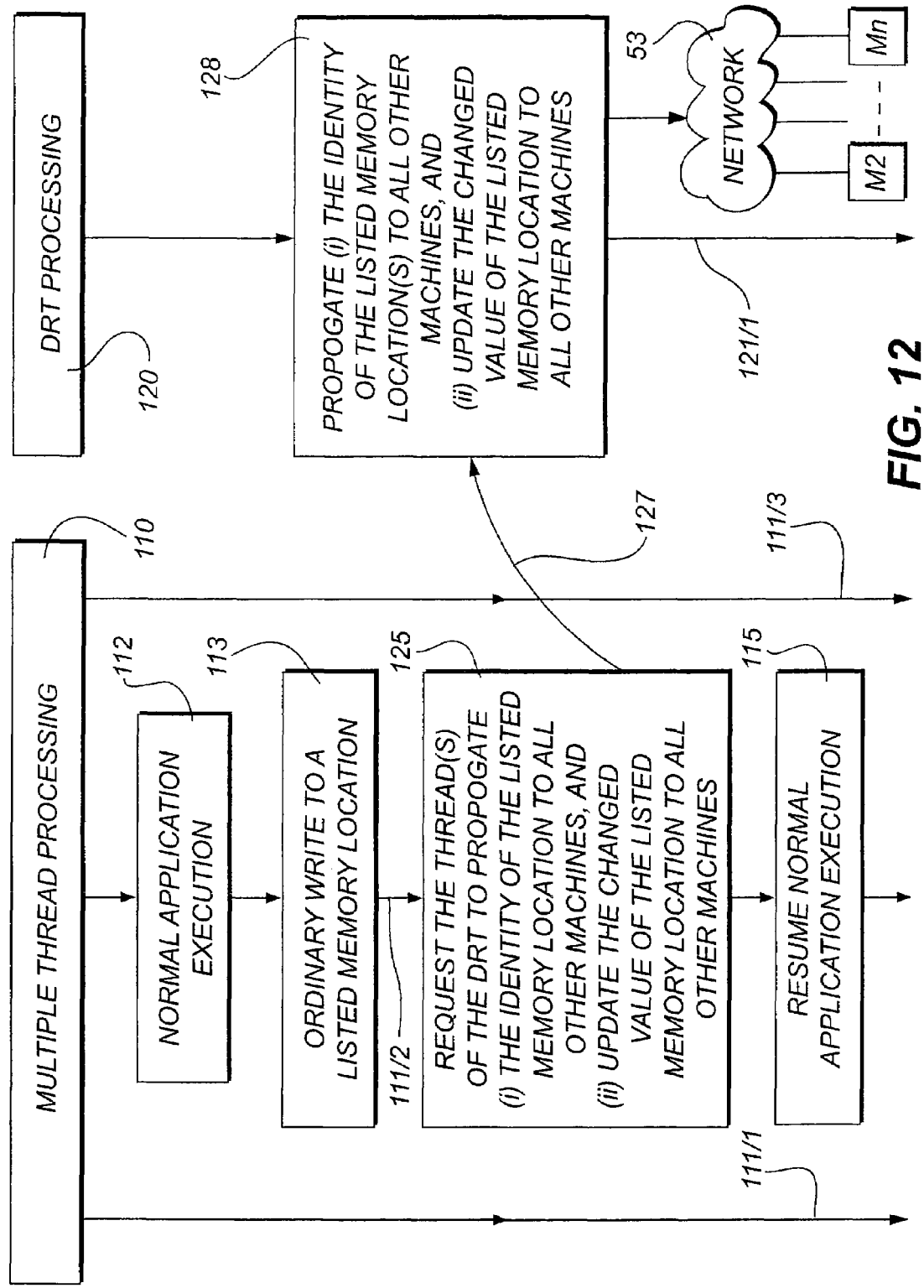
FIG. 12 is a schematic representation similar to FIG. 11 but illustrating an alternative embodiment.

Once this initial modification during the loading procedure has taken place, then either one of the multiple thread processing operations illustrated in FIGS. 11 and 12 takes place. As seen in FIG. 11, multiple thread processing 110 on the machines consisting of threads 111/1 . . . 111/4 is occurring and the processing of the second thread 111/2 (in this example) results in that thread 111/2 becoming aware at step 113 of a change of field value. At this stage the normal processing of that thread 111/2 is halted at step 114, and the same thread 111/2 notifies all other machines M2 . . . Mn via the network 53 of the identity of the changed field and the changed value which occurred at step 113. At the end of that communication procedure, the thread 111/2 then resumes the processing at step 115 until the next instance where there is a change of field value.

In the alternative arrangement illustrated in FIG. 12, once a thread 121/2 has become aware of a change of field value at step 113, it instructs DRT processing 120 (as indicated by step 125 and arrow 127) that another thread(s) 121/1 allocated to the DRT processing 120 is to propagate in accordance with step 128 via the network 53 to all other machines M2 . . . Mn the identity of the changed field and the changed value detected at step 113. This is an operation which can be carried out quickly and thus the processing of the initial thread 111/2 is only interrupted momentarily as indicated in step 125 before the thread 111/2 resumes processing in step 115. The other thread 121/1 which has been notified of the change (as indicated by arrow 127) then communicates that change as indicated in step 128 via the network 53 to each of the other machines M2 . . . Mn.

This second arrangement of FIG. 12 makes better utilisation of the processing power of the various threads 111/1 . . . 111/3 and 121/1 (which are not, in general, subject to equal demands) and gives better scaling with increasing size of "n", (n being an integer greater than or equal to 2 which represents the total number of machines which are connected to the network 53 and which run the application program 50 simultaneously). Irrespective of which arrangement is used, the changed field and identities and values detected at step 113 are propagated to all the other machines M2 ... Mn on the network.

Figure 13:
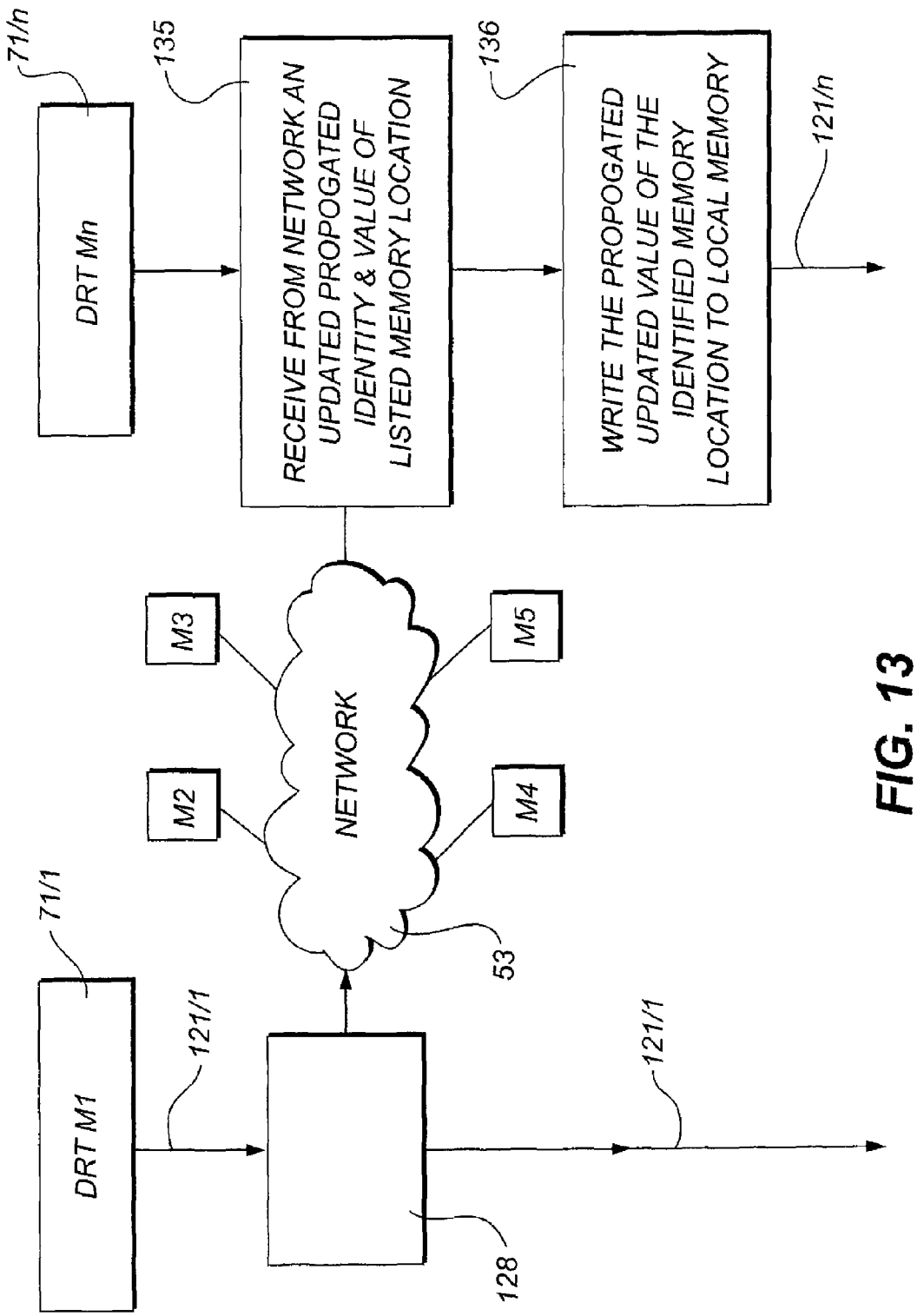
FIG. 13 illustrates multi-thread memory updating for the computers of FIG. 8.

This is illustrated in FIG. 13 where the DRT 71/1 and its thread 121/1 of FIG. 12 (represented by step 128 in FIG. 13) sends via the network 53 the identity and changed value of the listed memory location generated at step 113 of FIG. 12 by processing in machine M1, to each of the other machines M2 ... Mn.

Each of the other machines M2 ... Mn carries out the action indicated by steps 135 and 136 in FIG. 13 for machine Mn by receiving the identity and value pair from the network 53 and writing the new value into the local corresponding memory location.

Figure 1:
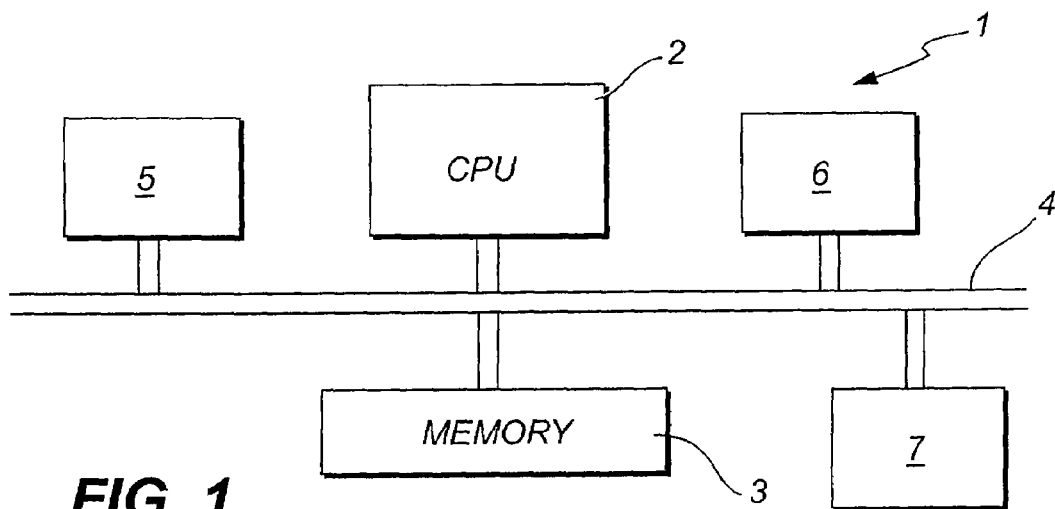
FIG. 1 is a schematic view of the internal architecture of a conventional computer.
Figure 2:
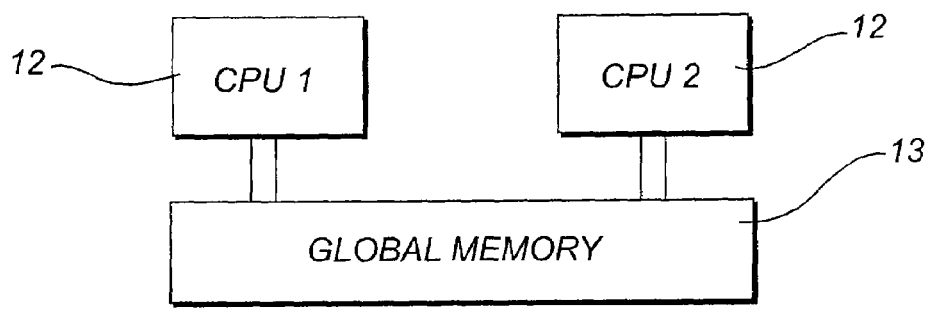
FIG. 2 is a schematic illustration showing the internal architecture of known symmetric multiple processors.
Figure 3:
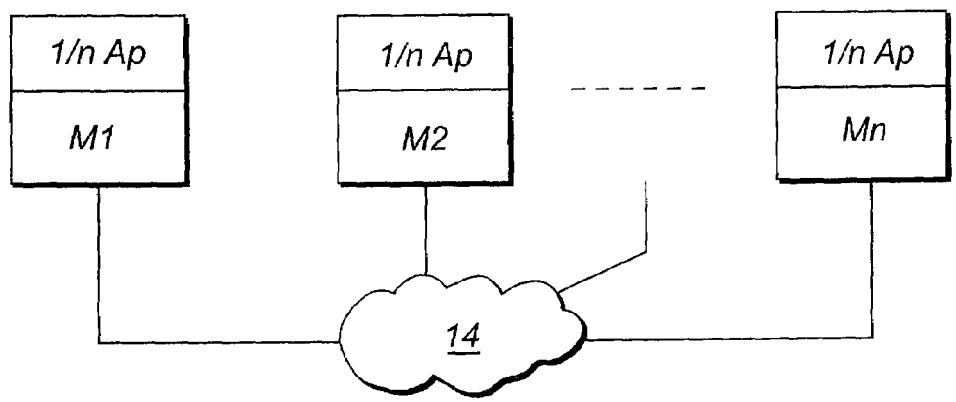
FIG. 3 is a schematic representation of prior art distributed computing.
Figure 4:
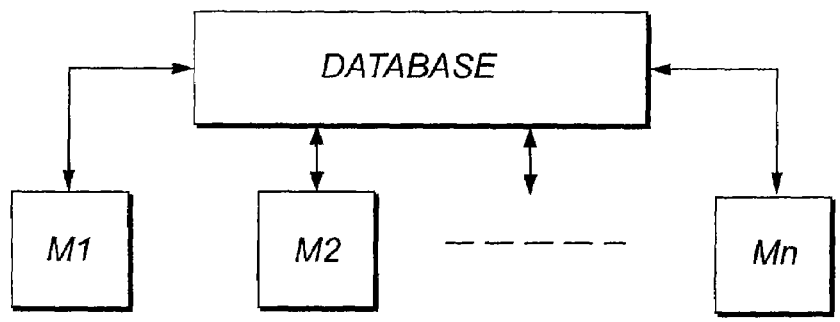
FIG. 4 is a schematic representation of a prior art network computing using clusters.

In the prior art arrangement in FIG. 3 utilising distributed software, memory accesses from one machine's software to memory physically located on another machine are permitted by the network interconnecting the machines. However, such memory accesses can result in delays in processing of the order of $10^6$-$10^7$ cycles of the central processing unit of the machine. This in large part accounts for the diminished performance of the multiple interconnected machines.

However, in the present arrangement as described above in connection with FIG. 8, it will be appreciated that all reading of data is satisfied locally because the current value of all fields is stored on the machine carrying out the processing which generates the demand to read memory. Such local processing can be satisfied within $10^2$-$10^3$ cycles of the central processing unit. Thus, in practice, there is substantially no waiting for memory accesses which involves reads.

However, most application software reads memory frequently but writes to memory relatively infrequently. As a consequence, the rate at which memory is being written or re-written is relatively slow compared to the rate at which memory is being read. Because of this slow demand for writing or re-writing of memory, the fields can be continually updated at a relatively low speed via the inexpensive commodity network 53, yet this low speed is sufficient to meet the application program's demand for writing to memory. The result is that the performance of the FIG. 8 arrangement is vastly superior to that of FIG. 3.

In a further modification in relation to the above, the identities and values of changed fields can be grouped into batches so as to further reduce the demands on the communication speed of the network 53 interconnecting the various machines.

It will also be apparent to those skilled in the art that in a table created by each DRT 71 when initially recording the fields, for each field there is a name or identity which is common throughout the network and which the network recognises. However, in the individual machines the memory location corresponding to a given named field will vary over time since each machine will progressively store changed field values at different locations according to its own internal processes. Thus the table in each of the DRTs will have, in general, different memory locations but each global "field name" will have the same "field value" stored in the different memory locations.

It will also be apparent to those skilled in the art that the abovementioned modification of the application program during loading can be accomplished in up to five ways by:

(i) re-compilation at loading, (ii) by a pre-compilation procedure prior to loading, (iii) compilation prior to loading, (iv) a "just-in-time" compilation, or (v) re-compilation after loading (but, or for example, before execution of the relevant or corresponding application code in a distributed environment).

Traditionally the term "compilation" implies a change in code or language, eg from source to object code or one language to another. Clearly the use of the term "compilation" (and its grammatical equivalents) in the present specification is not so restricted and can also include or embrace modifications within the same code or language.

In the first embodiment, a particular machine, say machine M2, loads the application code on itself, modifies it, and then loads each of the other machines M1, M3 ... Mn (either sequentially or simultaneously) with the modified code. In this arrangement, which may be termed "master/slave", each of machines M1, M3, ... Mn loads what it is given by machine M2.

In a still further embodiment, each machine receives the application code, but modifies it and loads the modified code on that machine. This enables the modification carried out by each machine to be slightly different being optimized based upon its architecture and operating system, yet still coherent with all other similar modifications.

In a further arrangement, a particular machine, say M1, loads the unmodified code and all other machines M2, M3 ... Mn do a modification to delete the original application code and load the modified version.

In all instances, the supply can be branched (ie M2 supplies each of M1, M3, M4, etc directly) or cascaded or sequential (ie M2 applies M1 which then supplies M3 which then supplies M4, and so on).

In a still further arrangement, the machines M1 to Mn, can send all load requests to an additional machine (not illustrated) which is not running the application program, which performs the modification via any of the aforementioned methods, and returns the modified routine to each of the machines M1 to Mn which then load the modified routine locally. In this arrangement, machines M1 to Mn forward all load requests to this additional machine which returns a modified routine to each machine. The modifications performed by this additional machine can include any of the modifications covered under the scope of the present invention.

Persons skilled in the computing arts will be aware of at least four techniques used in creating modifications in computer code. The first is to make the modification in the original (source) language. The second is to convert the original code (in say JAVA) into an intermediate representation (or intermediate language). Once this conversion takes place the modification is made and then the conversion is reversed. This gives the desired result of modified JAVA code.

The third possibility is to convert to machine code (either directly or via the abovementioned intermediate language). Then the machine code is modified before being loaded and executed. The fourth possibility is to convert the original code to an intermediate representation, which is then modified and subsequently converted into machine code.

The present invention encompasses all four modification routes and also a combination of two, three or even all four, of such routes.

Figure 14:
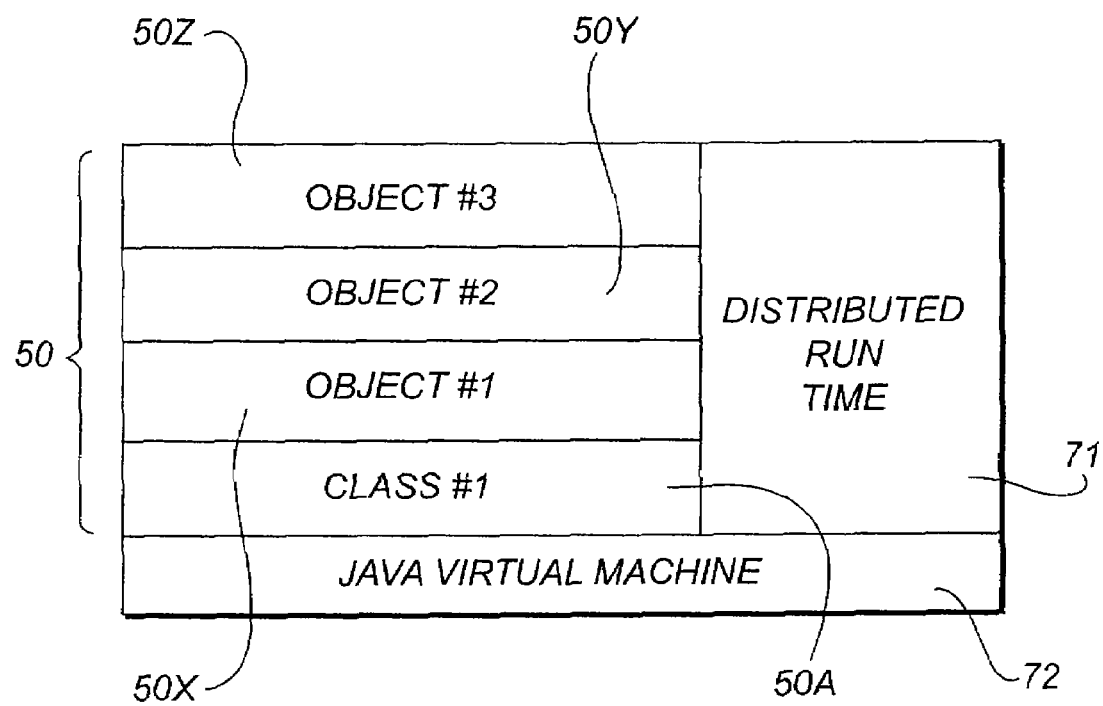
FIG. 14 is a schematic illustration of a prior art computer arranged to operate in JAVA code and thereby constitute a JAVA virtual machine.

Turning now to FIG. 14, there is illustrated a schematic representation of a single prior art computer operated as a JAVA virtual machine. In this way, a machine (produced by any one of various manufacturers and having an operating system operating in any one of various different languages)

can operate in the particular language of the application program 50, in this instance the JAVA language. That is, a JAVA virtual machine 72 is able to operate code 50 in the JAVA language, and utilize the JAVA architecture irrespective of the machine manufacturer and the internal details of the machine.

Furthermore, the single machine of FIG. 14 is able to easily perform synchronization of specific objects 50X-50Z when specified by the programmer's use of a synchronization routine. As each object exists only locally, the single JAVA virtual machine 72 of FIG. 14 is able to ensure that an object is properly synchronized as specified by the programmer and thus only utilized by one part of the executable code at any single point in time. If another part of the executable code wishes to use the same object then the possible contention is resolved by the JAVA virtual machine 72 such that other executing parts of the application program have to wait until the first part has finished.

The same procedure applies mutatis mutandis for classes 50A. In particular, the computer programmer when writing a program using the JAVA language and architecture, need only to use a synchronization routine(s) in order to provide for this avoidance of contention. Thus a single JAVA virtual machine can keep track of utilization of the classes and objects and avoid any corresponding problems as necessary in an unobtrusive fashion. The process whereby only one object or class is exclusively used is termed "synchronization". In the JAVA language the instructions "monitorenter" and "monitorexit" signify the beginning and ending of a synchronization routine which results in the acquiring of and releasing of a "lock" respectively which prevents an asset being the subject of contention.

However, in the arrangement illustrated in FIG. 8, (and also in FIGS. 20-22), a plurality of individual computers or machines M1, M2 . . . Mn are provided each of which are interconnected via a communications network 53 and each of which is provided with a modifier 51 (as in FIG. 5 and realized by the DRT 71 in FIG. 8) and loaded with a common application program 50. Essentially the modifier 51 or DRT 71 ensures that when part of the application program 50 running on one of the machines exclusively utilizes (eg, by means of synchronization) a particular local asset, such as an objects 50X-50Z or class 50A, no other machine M2 . . . Mn utilizes the corresponding asset in its local memory.

In particular, whilst one particular machine (say, M3) is exclusively using an object or class, another machine (say M5) may also be instructed by the code it is executing to exclusively use that object or class at that time. Thus if the object or class were to be exclusively used by both machines, then the behaviour of the object and application as a whole is undefined—that is, in the absence of proper exclusive use of an object when explicitly specified by the programmer, permanent inconsistency between machine M5 and machine M3 is likely to result. Thus the goal of substantially identical memory contents for each of the machines M1, M2 . . . Mn, as required for simultaneous operation of the same application program, would not be achieved.

In order to ensure consistent synchronization the application program is scrutinized in order to detect program steps which define a synchronization routine. This scrutiny can take place either prior to loading, or during the loading procedure, or even after the loading procedure (but before execution of the relevant corresponding portion of the application code). It may be likened to a compilation procedure with the understanding that the term compilation normally involves a change in code or language, eg from source to object code or one language to another. However, in the present instance the term "compilation" (and its grammatical equivalents) is not so restricted and can also include embrace modifications within the same code or language.

Reference is made to the accompanying Annexure D in which:

Annexure D1 is a typical code fragment from an unmodified synchronization routine, and Annexure D2 is an equivalent in respect of a modified synchronization routine, Annexures D1 and D2 are the before and after excerpt of a synchronization routine respectively. The modified code that is added to the method is highlighted in bold. In the original code sample of Annexure D1, the code increments a shared memory location (counter) within in synchronize statement. The purpose of the synchronize statement is to ensure thread-safety of the increment operation in multi-threaded applications. Thus, without management of synchronization in a distributed environment, each machine would perform synchronization in isolation, thus potentially incrementing the shared counter at the same time, leading to potential race condition(s) and incoherent memory. Clearly this is not what the programmer of the application program expects to happen.

So, taking advantage of the DRT, the application code is modified as it is loaded into the machine by changing the synchronization routine. The changes made (highlighted in bold) are the initial instructions and ending instructions that the synchronization routine executes. These added instructions act to additionally perform synchronization across all other machines in the distributed environment, thereby preserving the synchronize behaviour of the application program across a plurality of machines.

The acquireLock( ) method of the DRT takes an argument which represents a unique identifier for this object (See Annexure D2), for example the name of the object, a reference to the object in question, or a unique number representing this object across all nodes, to be used in acquiring a global lock of the specified object. This way, the DRT can support the synchronization of multiple objects at the same time without becoming confused as to which of the multiple objects are already synchronized and which are not, by using the unique identifier of each object to consult the correct record in the shared synchronization table.

The DRT can determine the synchronization state of the object in a number of ways. Preferably, it can ask each machine in turn if their local copy of this object is presently synchronized, and if any machine replies true, then to wait until that object is unsynchronised, otherwise synchronize this object locally. Alternatively, the DRT on the local machine can consult a shared record table (perhaps on a separate machine (eg machine X), or a coherent shared record table on the local machine, or a database) to determine if this object has been marked as synchronized by any other machine, and if so, then wait until the status of the object is changed to "unsynchronised" and then acquire the lock by marking the object as synchronized, otherwise acquire the lock by marking the object as synchronized by this machine.

If the DRT determines that no other machine currently has a lock for this object (ie, no other machine has synchronized this object), then to acquire the lock for this object on all other machines, for example by means of modifying the corresponding entry in a shared table of synchronization states, or alternatively, sequentially acquiring the lock on all other machines in addition the current machine. Only once this machine has successfully confirmed that no other machine has currently synchronized this object, and this machine has correspondingly synchronized locally, can the execution of the original synchronized code-block begin.

On the other hand, if the DRT determines that another machine has already synchronized this object, then this machine is to postpone execution of the original synchronize code-block until such a time as the DRT can confirm than no other machine is presently executing a synchronize statement for this object, and that this machine has correspondingly synchronized the object locally. In such a case, the original code block is NOT to be executed until this machine can guarantee that no other machine is executing a synchronize statement for this object, as it will potentially corrupt the object across the participating machines due to race-conditions, inconsistency of memory, and so forth resulting from the concurrent execution of synchronized statements. Thus, when the DRT determines that this object is presently "synchronized", the DRT prevents execution of the original code-block by pausing the execution of the "acquireLock( )" operation until such a time as a corresponding "releaseLock( )" operation is executed by the present owner of the lock.

Thus, on execution of a "releaseLock( )" operation, the machine which presently "owns" a lock (ie, is executing a synchronized statement) indicates the close of its synchronized statement, for example by marking this object as "unsynchronised" in the shared table of synchronization states, or alternatively, sequentially releasing locks acquired on all other machines. At this point, any other machine waiting to begin execution of a corresponding synchronized statement can then claim ownership of this object's lock by resuming execution of its postponed (ie delayed) "acquireLock( )" operation, for example, marking itself as executing a synchronized statement for this object in the shared table of synchronization states, or alternatively, sequentially acquiring local locks on each of the other machines.

So, taking advantage of the DRT, the application code is modified as it is loaded into the machine by changing the synchronization routine (consisting of a beginning "monitorenter" and an ending "monitorexit" instruction/s). The changes made (highlighted in bold) are the initial instructions that the synchronization routine executes. These added instructions check if this lock has already been acquired by another machine. If this lock has not been acquired by another machine, then the DRT of this machine notifies all other machines that this machine has acquired the lock, and thereby stopping the other machines from executing synchronization routines for this lock.

The DRT can record the lock status of the machines in many ways, for example:

1. corresponding to the entry to a synchronization routine, the DRT individually consults each machine to ascertain if this lock is already acquired. If so, the DRT pauses the execution of the synchronization routine until all other machines no longer own a lock on this asset or object. Otherwise, the DRT executes this synchronization routine. Alternatively, 2. corresponding to the entry to a synchronization routine, the DRT consults a shared table of records (for example a shared database, or a copy of a shared table on each of the participating machines) which indicate if any machine currently "owns" this lock. If so, the DRT then pauses execution of the synchronization routine on this machine until all other machines no longer own a lock on this object. Otherwise the DRT records this machine in the shared table (or tables, if there are multiple tables of records, eg, on multiple machines) as the owner of this lock, and then executes the synchronization routine.

Similarly, when a lock is released, that is to say, when the execution of a synchronization routine is to end, the DRT can "un-record" the lock status of machines in many alternative ways, for example:

1. corresponding to the exit to a synchronization routine, the DRT individually notifies each other machine that it no longer owns the lock. Alternatively, 2. corresponding to the exit to a synchronization routine, the DRT updates the record for this locked asset or object in the shared table(s) of records such that this machine is no longer recorded as owning this lock.

Still further, the DRT can queue machines needing to acquire a locked object in multiple alternative ways, for example:

1. corresponding to the entry to a synchronization routine, the DRT notifies the present owner of the locked object that a specific machine would like to acquire the lock upon release by the current owning machine. The specified machine, if there are no other waiting machines, then stores a record of the specified machine's interest in a table, which, following the exit of the synchronization routine of the locked object, then notifies the waiting machine that it can acquire this locked object, and thus begin executing its synchronization routine, 2. corresponding to the entry to a synchronization routine, the DRT notifies the present owner of the locked object that a specific machine (say machine M6) would like to acquire the lock upon release by that machine (say machine M4). That machine M4, if it finds after consulting its records of waiting machines for this locked object, finds that there are already one or more machines waiting, then either appends machine M6 to the end of the list of machines wanting to acquire this locked object, or alternatively, forwards the request from M6 to the first waiting, or any other machine waiting, machine which then, in turn, records machine M6 in their table of records, 3. corresponding to the entry to a synchronization routine, the DRT records itself in a shared table(s) of records (for example, a table stored in a shared database accessible by all machines, or multiple separate tables which are substantially similar).

Still further, the DRT can notify other machines queued to acquire this lock corresponding to the exit of a synchronization routine by this machine in the following alternative ways, for example:

1. corresponding to the exit of a synchronization routine, the DRT notifies one of the awaiting machines (for example, this first machine in the queue of waiting machines) that the lock is released, 2. corresponding to the exit of a synchronization routine, the DRT notifies one of the awaiting machines (for example, the first machine in the queue of waiting machines) that the lock is released, and additionally, provides a copy of the entire queue of machines (for example, the second machine and subsequent machines awaiting for this lock). This way, the second machine inherits the list of waiting machines from the first machine, and thereby ensures the continuity of the queue of waiting machines as each machine in turn down the list acquires and subsequently releases the lock.

During the abovementioned scrutiny, "monitorenter" and "monitorexit" instructions (or methods) are initially looked for and, when found, a modifying code is inserted so as to give rise to a modified synchronization routine. This modified routine acquires and releases a lock. There are several different modes whereby this modification and loading can be carried out.

Figure 15:
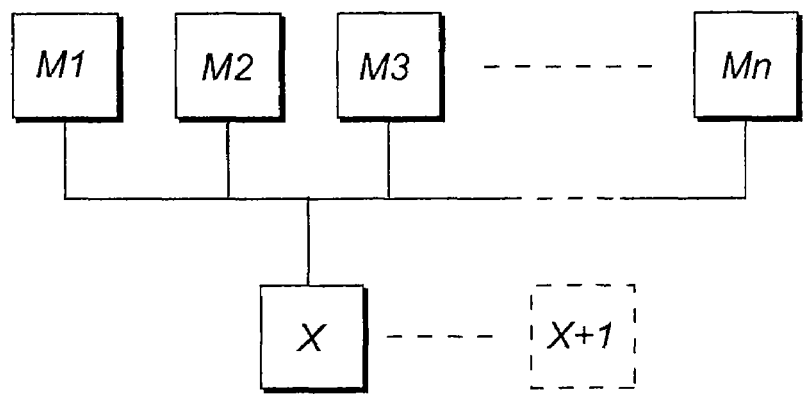
FIG. 15 is a schematic representation of n machines running the application program and serviced by an additional server machine X.

As seen in FIG. 15 a modification to the general arrangement of FIG. 8 is provided in that machines M1, M2 . . . Mn are as before and run the same application program 50 (or programmes) on all machines simultaneously. However, the previous arrangement is modified by the provision of a server machine X which is conveniently able to supply housekeeping functions, for example, and especially the synchronization of structures, assets and resources. Such a server machine X can be a low value commodity computer such as a PC since its computational load is low. As indicated by broken lines in FIG. 15, two server machines X and X+1 can be provided for redundancy purposes to increase the overall reliability of the system. Where two such server machines X and X+1 are provided, they are preferably operated as dual machines in a cluster.

It is not necessary to provide a server machine X as its computational load can be distributed over machines M1, M2 . . . Mn. Alternatively, a database operated by one machine (in a master/slave type operation) can be used for the housekeeping function(s).

Figure 16:
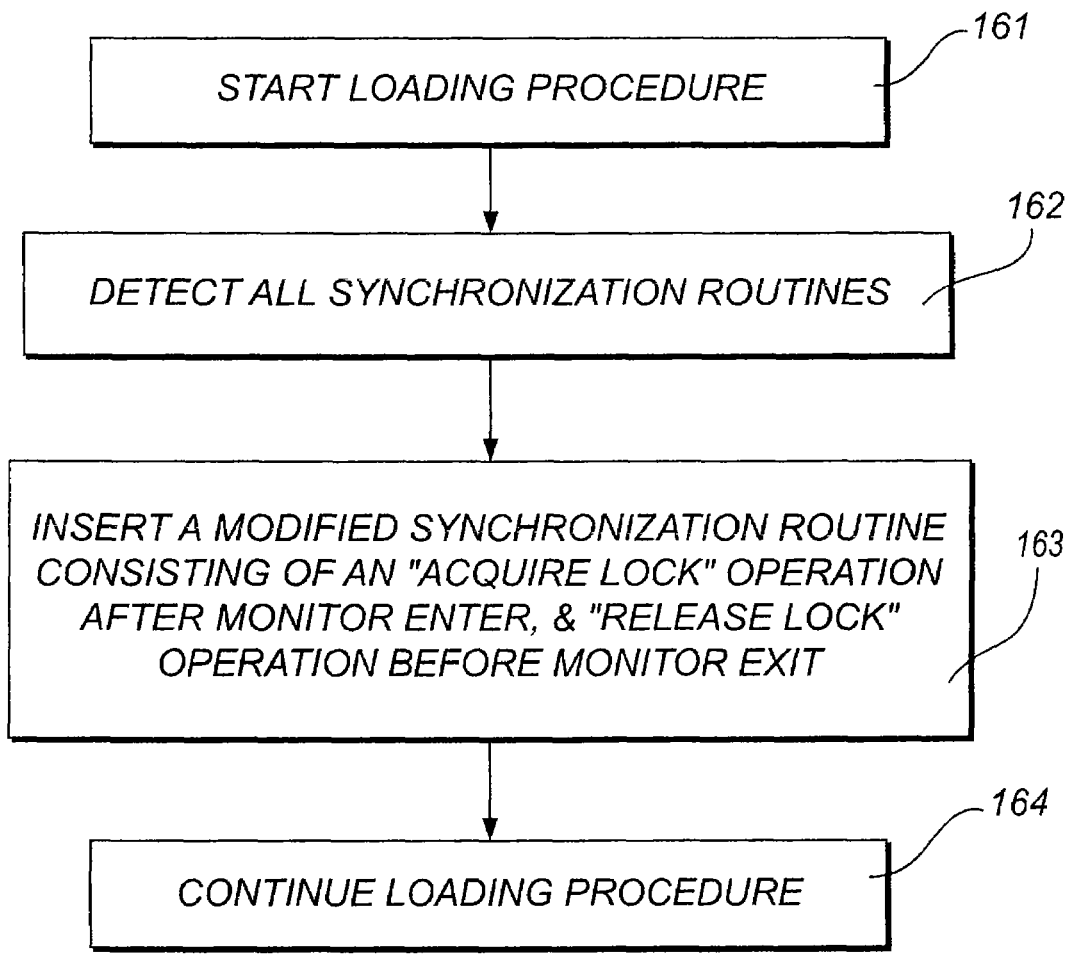
FIG. 16 is a flow chart of illustrating the modification of the monitor enter and exit routines.

FIG. 16 shows a preferred general procedure to be followed. After loading 161 has been commenced, the instructions to be executed are considered in sequence and all synchronization routines are detected as indicated in step 162. In the JAVA language these are the "monitorenter" and "monitorexit" instructions. Other languages use different terms.

Where a synchronization routine is detected, it is modified, typically by inserting further instructions into the routine. Alternatively, the modifying instructions could be inserted prior to the routine. Once the modification has been completed the loading procedure continues. The modifications preferably take the form of an "acquire lock on all other machines" operation and a "release lock on all other machines" modification as indicated at step 163.

Figure 17:
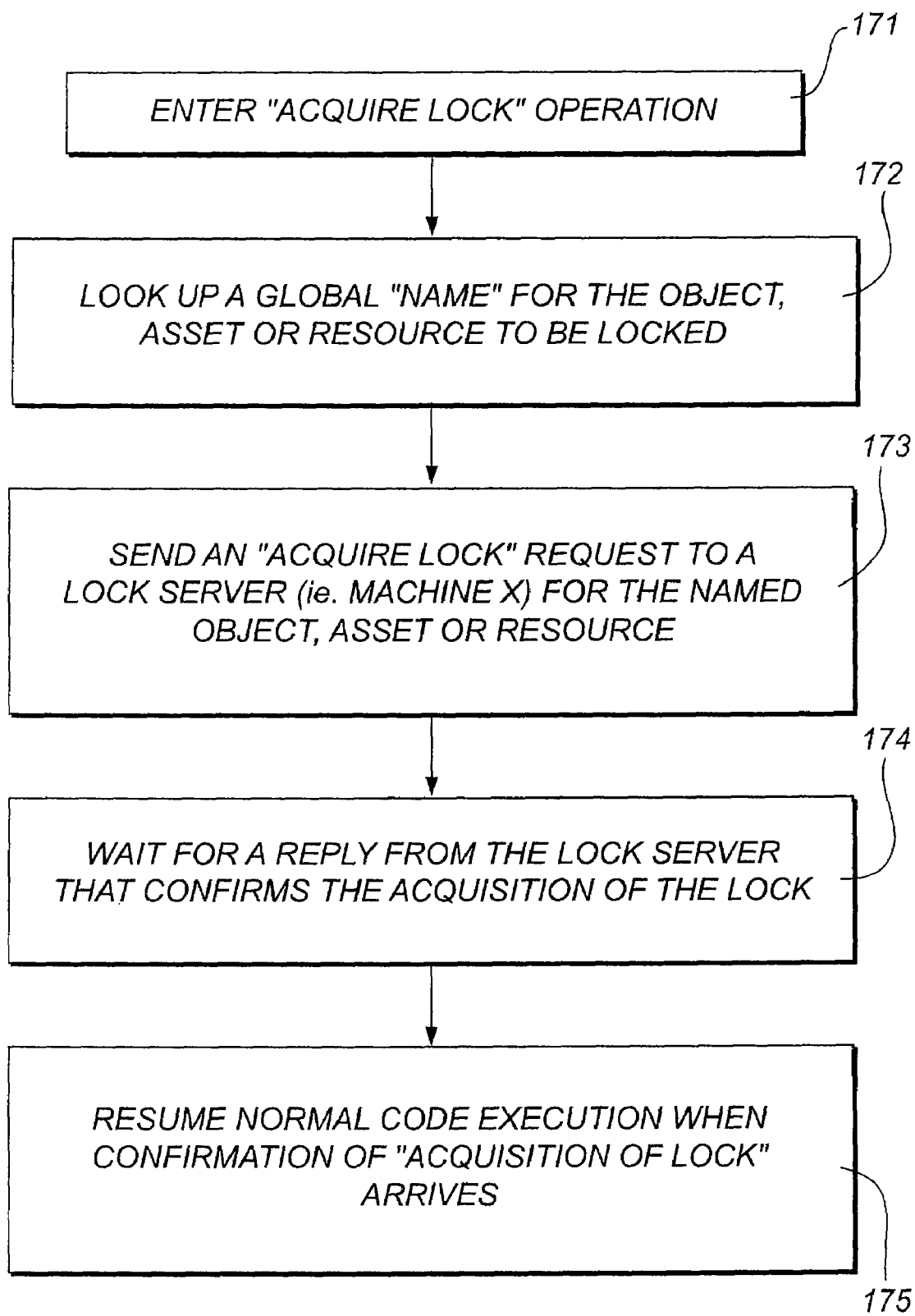
FIG. 17 is a flow chart illustrating the process followed by processing machine in requesting the acquisition of a lock.

FIG. 17 illustrates a particular form of modification. Firstly, the structures, assets or resources (in JAVA termed classes or objects eg 50A, 50X-50Y) to be synchronized have already been allocated a name or tag which can be used globally by all machines, as indicated by step 172. This preferably happens when the classes or objects are originally initialized. This is most conveniently done via a table maintained by server machine X. This table also includes the synchronization status of the class or object. In the preferred embodiment, this table also includes a queue arrangement which stores the identities of machines which have requested use of this asset.

As indicated in step 173 of FIG. 17, next an "acquire lock" request is sent to machine X, after which, the sending machine awaits for confirmation of lock acquisition as shown in step 174. Thus, if the global name is already locked (ie the corresponding asset is in use by another machine other than the machine proposing to acquire the lock) then this means that the proposed synchronization routine of the object or class should be paused until the object or class is unlocked by the current owner.

Alternatively, if the global name is not locked, this means that no other machine is using this class or object, and confirmation of lock acquisition is received straight away. After receipt of confirmation of lock acquisition, execution of the synchronization routine is allowed to continue, as shown in step 175

Figure 18:
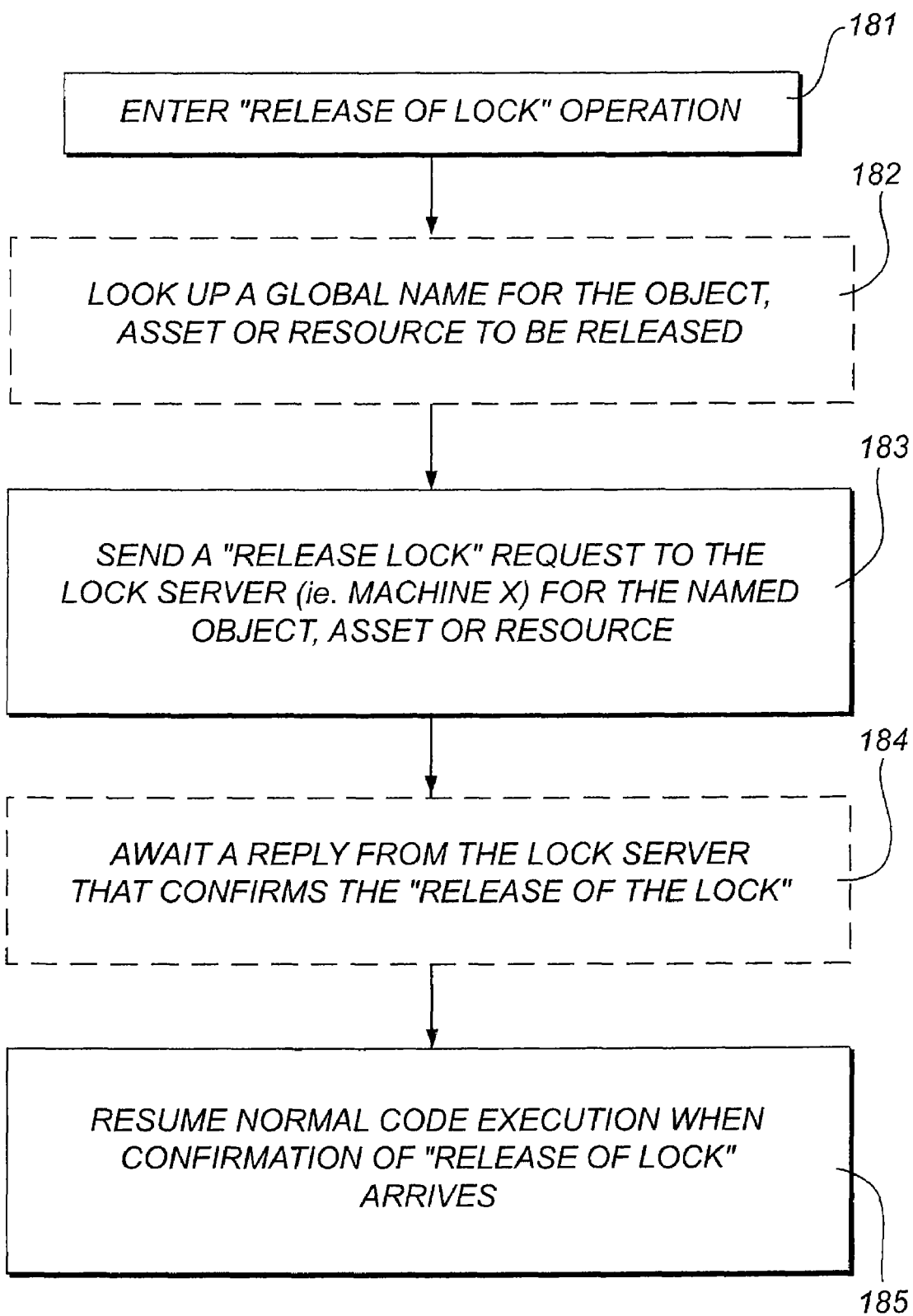
FIG. 18 is a flow chart illustrating the requesting of the release of a lock.

FIG. 18 shows the procedures followed by the application program executing machine which wishes to relinquish a lock. The initial step is indicated at step 181. The operation of this proposing machine is temporarily interrupted by steps 183, 184 until the reply is received from machine X, corresponding to step 184, and execution then resumes as indicated in step 185. Optionally, and as indicated in step 182, the machine requesting release of a lock is made to lookup the "global name" for this lock preceding a request being made to machine X. This way, multiple locks on multiple machines can be acquired and released without interfering with one another.

Figure 19:
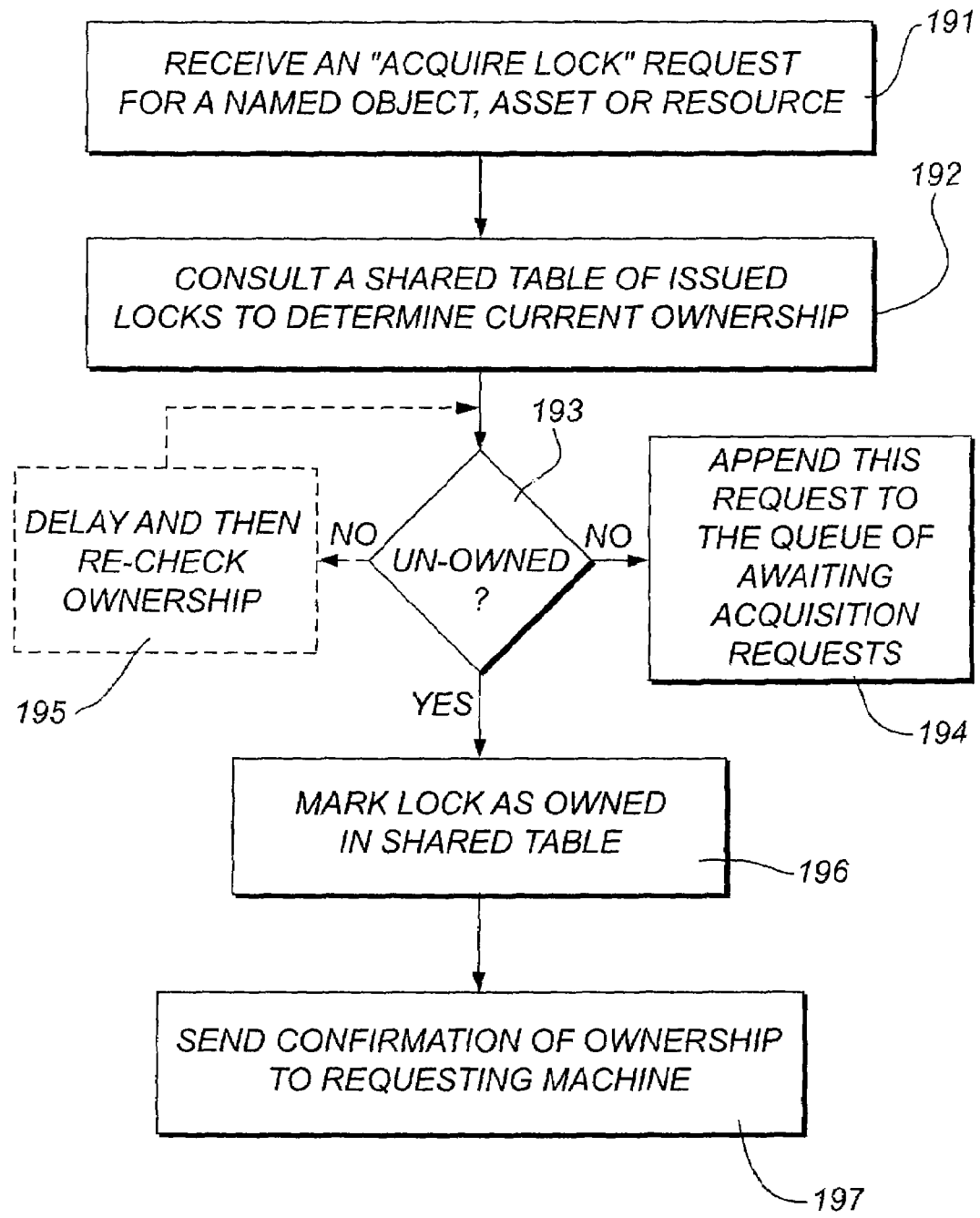
FIG. 19 is a flow chart of the response of the server machine X to the request of FIG. 17.

FIG. 19 shows the activity carried out by machine X in response to an "acquire lock" enquiry (of FIG. 17). After receiving an "acquire lock" request at step 191, the lock status is determined at steps 192 and 193 and, if no—the named resource is not free, the identity of the enquiring machine is added at step 194 to (or forms) the queue of awaiting acquisition requests. Alternatively, if the answer is yes—the named resource is free—the corresponding reply is sent at step 197. The waiting enquiring machine is then able to execute the synchronization routine accordingly by carrying out step 175 of FIG. 17. In addition to the yes response, the shared table is updated at step 196 so that the status of the globally named asset is changed to "locked".

Figure 20:
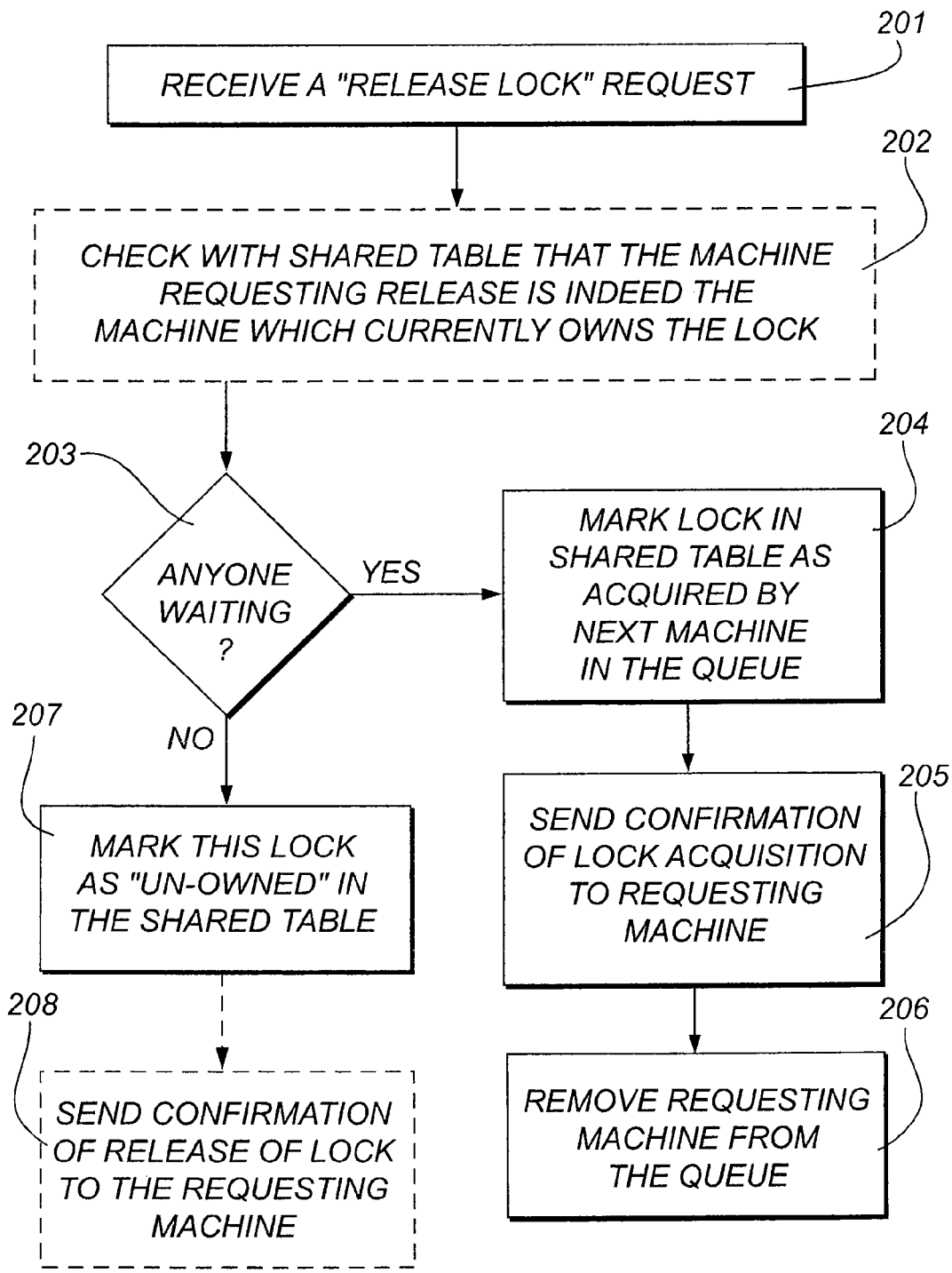
FIG. 20 is a flow chart illustrating the response of the server machine X to the request of FIG. 18.

FIG. 20 shows the activity carried out by machine X in response to a "release lock" request of FIG. 18. After receiving a "release lock" request at step 201, machine X optionally, and preferably, confirms that the machine requesting to release the lock is indeed the current owner of the lock", as indicated in step 202. Next, the queue status is determined at step 203 and, if no-one is waiting to acquire this lock, machine X marks this lock as "unowned" in the shared table, as shown in step 207, and optionally sends a confirmation of release back to the requesting machine, as indicated by step 208. This enables the requesting machine to execute step 185 of FIG. 18.

Alternatively, if yes—that is, other machines are waiting to acquire this lock—machine X marks this lock as now acquired by the next machine in the queue, as shown in step 204, and then sends a confirmation of lock acquisition to the queued machine at step 205, and consequently removes the new lock owner from the queue of waiting machines, as indicated in step 206.

Given the fundamental concept of modifying the synchronization routines there are several different ways in which this concept can be implemented.

In the first embodiment, a particular machine, say machine M2, loads the synchronization routine on itself, modifies it, and then loads each of the other machines M1, M3 . . . Mn (either sequentially or simultaneously) with the modified synchronization routine. In this arrangement, which may be termed "master/slave" each of machines M1, M3, . . . Mn loads what it is given by machine M2.

In a variation of this "master/slave" arrangement, machine M2 loads the synchronization routine in unmodified form on machine M2 and then on the other machines deletes the synchronization routine in its entirety and loads the modified code. Thus in this instance the modification is not a by-passing of the synchronization routine but a deletion of it on all machines except one.

In a still further embodiment, each machine receives the synchronization routine, but modifies it and loads the modified routine on that machine. This enables the modification carried out by each machine to be slightly different being optimized based upon its architecture and operating system, yet still coherent with all other similar modifications.

In a further arrangement, a particular machine, say M1, loads the unmodified synchronization routine and all other machines M2, M3 . . . Mn do a modification to delete the original synchronization routine and load the modified version.

In all instances, the supply can be branched (ie M2 supplies each of M1, M3, M4, etc directly) or cascaded or sequential (ie M2 applies M1 which then supplies M3 which then supplies M4, and so on).

In a still further arrangement, the machines M1 to Mn, can send all load requests to an additional machine X (of FIG. 15), which performs the modification via any of the afore mentioned methods, and returns the modified routine to each of the machines M1 to Mn which then load the modified routine locally. In this arrangement, machines M1 to Mn forward all load requests to machine X, which returns a modified routine to each machine. The modifications performed by machine X can include any of the modifications covered under the scope of the present invention.

Persons skilled in the computing arts will be aware of four techniques used in creating modifications in computer code. The first is to make the modification in the original (source) language. The second is to convert the original code (in say JAVA) into an intermediate representation (or intermediate language). Once this conversion takes place the modification is made and then the conversion is reversed. This gives the desired result of modified JAVA code.

The third possibility is to convert to machine code (either directly or via the abovementioned intermediate language). Then the machine code is modified before being loaded and executed. The fourth possibility is to convert the original code to an intermediate representation, which is then modified and subsequently converted into machine code.

The present invention encompasses all four modification routes and also a combination of two, three or even all four, of such routes.

Figure 21:
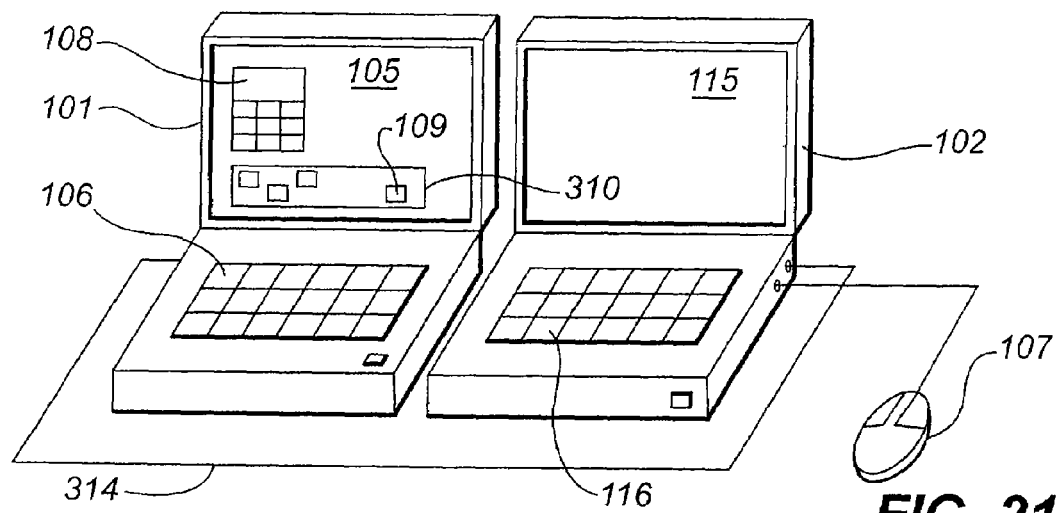
FIG. 21 is a schematic representation of two laptop computers interconnected to simultaneously run a plurality of applications, with both applications running on a single computer.
Figure 22:
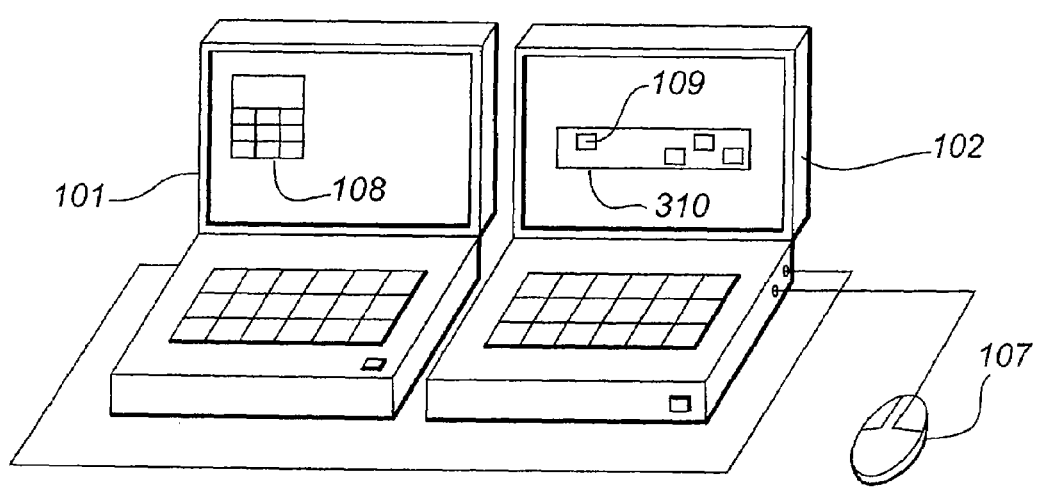
FIG. 22 is a view similar to FIG. 21 but showing the FIG. 21 apparatus with one application operating on each computer.
Figure 23:
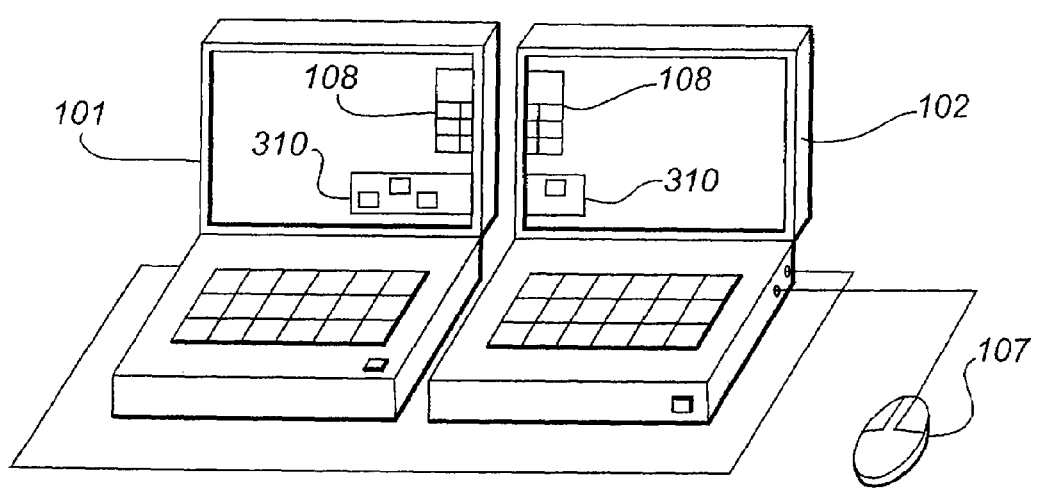
FIG. 23 is a view similar to FIGS. 21 and 22 but showing the FIG. 21 apparatus with both applications operating simultaneously on both computers.

Turning now to FIGS. 21-23, two laptop computers 101 and 102 are illustrated. The computers 101 and 102 are not necessarily identical and indeed, one can be an IBM or IBM-clone and the other can be an APPLE computer. The computers 101 and 102 have two screens 105, 115 two keyboards 106, 116 but a single mouse 107. The two machines 101, 102 are interconnected by a means of a single coaxial cable or twisted pair cable 314.

Two simple application programs are downloaded onto each of the machines 101, 102, the programs being modified as they are being loaded as described above. In this embodiment the first application is a simple calculator program and results in the image of a calculator 108 being displayed on the screen 105. The second program is a graphics program which displays four coloured blocks 109 which are of different colours and which move about at random within a rectangular box 310. Again, after loading, the box 310 is displayed on the screen 105. Each application operates independently so that the blocks 109 are in random motion on the screen 105 whilst numerals within the calculator 108 can be selected (with the mouse 107) together with a mathematical operator (such as addition or multiplication) so that the calculator 108 displays the result.

The mouse 107 can be used to "grab" the box 310 and move same to the right across the screen 105 and onto the screen 115 so as to arrive at the situation illustrated in FIG. 22. In this arrangement, the calculator application is being conducted on machine 101 whilst the graphics application resulting in display of box 310 is being conducted on machine 102.

However, as illustrated in FIG. 23, it is possible by means of the mouse 107 to drag the calculator 108 to the right as seen in FIG. 22 so as to have a part of the calculator 108 displayed by each of the screens 105, 115. Similarly, the box 310 can be dragged by means of the mouse 107 to the left as seen in FIG. 22 so that the box 310 is partially displayed by each of the screens 105, 115 as indicated FIG. 23. In this configuration, part of the calculator operation is being performed on machine 101 and part on machine 102 whilst part of the graphics application is being carried out the machine 101 and the remainder is carried out on machine 102.

The foregoing describes only some embodiments of the present invention and modifications, obvious to those skilled in the art, can be made thereto without departing from the scope of the present invention. For example, reference to JAVA includes both the JAVA language and also JAVA platform and architecture.

Those skilled in the programming arts will be aware that when additional code or instructions is/are inserted into an existing code or instruction set to modify same, the existing code or instruction set may well require further modification (eg by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Micrsoft.NET platform and architecture (Visual Basic, Visual C/C++, and C#) FORTRAN, C/C++, COBOL, BASIC etc.

The abovementioned embodiment in which the code of the JAVA synchronization routine is modified, is based upon the assumption that either the run time system (say, JAVA HOTSPOT VIRTUAL MACHINE written in C and JAVA) or the operating system (LINUX written in C and Assembler, for example) of each machine M1 . . . Mn will normally acquire the lock on the local machine (say M2) but not on any other machines (M1, M3 . . . Mn). It is possible to leave the JAVA synchronization routine unamended and instead amend the LINUX or HOTSPOT routine which acquires the lock locally, so that it correspondingly acquires the lock on all other machines as well. In order to embrace such an arrangement the term "synchronization routine" is to be understood to include within its scope both the JAVA synchronization routine and the "combination" of the JAVA synchronization routine and the LINUX or HOTSPOT code fragments which perform lock acquisition and release.

The terms object and class used herein are derived from the JAVA environment and are intended to embrace similar terms derived from different environments such as dynamically linked libraries (DLL), or object code packages, or function unit or memory locations.

The term "comprising" (and its grammatical variations) as used herein is used in the inclusive sense of "having" or "including" and not in the exclusive sense of "consisting only of".

COPYRIGHT NOTICE

This patent specification contains material which is subject to copyright protection. The copyright owner (which is the applicant) has no objection to the reproduction of this patent specification or related materials from publicly available associated Patent Office files for the purposes of review, but otherwise reserves all copyright whatsoever. In particular, the various instructions are not to be entered into a computer without the specific written approval of the copyright owner.

The invention claimed is:

1. A multiple computer system having at least one application program each written to operate on only a single computer but running substantially simultaneously on a plurality of single computers interconnected by a communications network; the system comprising:
   a local independent memory structure defined for each of the plurality of single computers configured to provide execution of application program code of the application program including a plurality of code threads that are written with the intent to execute on and reference a single computer having a single processing unit or symmetric multiple processing units and a single independent local memory with a local memory capacity that is not shared with any other single computer of said plurality of single computers wherein all read requests by each single computer are satisfied from the local memory of the requesting computer;
   wherein different portions of said at least one application program executes substantially simultaneously on different ones of said computers and for each portion a like plurality of substantially identical objects are created in each independent local memory of the corresponding single computer and each object having a substantially identical name; and
   said multiple computer system including a lock means modified from that required to operate on only a single computer and loaded into each of said plurality of single computers; and
   wherein any of said plurality of computers wishing to utilize one of said substantially identically named objects therein acquires an authorizing lock from said lock means which permits said utilization of said named object and which prevents all the other of said single computers from utilizing their corresponding named object until said authorizing lock is relinquished.

2. The system as claimed in claim 1 wherein said lock means includes an acquire lock routine and a release lock routine, and both said routines are included in modifications made to said application program running on all said computers.

3. The system as claimed in claim 2 wherein said lock means further includes a shared table listing said named objects in use by any said computer, a lock status for each said object, and a queue of any pending lock acquisitions.

4. The system as claimed in claim 3 wherein said lock means is located within an additional computer not running said application program and connected to said communications network.

5. The system as claimed in claim 2 wherein each said application program is modified before, during, or after loading by inserting said acquire lock routine and said release lock routine to modify each instance at which said application program acquires and releases respectively a lock on an object.

6. The system as claimed in claim 3 wherein the application program is modified in accordance with a procedure selected from the group of procedures consisting of re-compilation at loading, pre-compilation prior to loading, compilation prior to loading, just-in-time compilation, and re-compilation after loading and before execution of the relevant portion of application program.

7. The system as claimed in claim 2 wherein said modified application program is transferred to all said computers in accordance with a procedure selected from the group consisting of master/slave transfer, branched transfer and cascaded transfer.

8. A plurality of single computers interconnected via a communications link and operating substantially simultaneously at least one application program each written to operate on only a single computer, the application program having application program code including a plurality of code threads all intended to execute on and reference a single computer having a single processing unit or symmetric multiple processing units and a single independent local memory with a local memory capacity that is not shared with any other single computer of said plurality of single computers;
   each said single computer substantially simultaneously executes a different portion of said at least one application program; and wherein each said single computer in operating said at least one application program different portion utilizes an named object only by using a local replica of the named object in independent local memory physically located in each said single computer with a local memory capacity that is not shared with or accessible by any other single computer of said plurality of single computers wherein all read requests by each single computer are satisfied from the local memory of the requesting computer; the contents of the independent local memory utilized by each said computer is fundamentally similar but not, at each instant, identical; and
   every one of said single computers has an acquire lock routine and a release lock routine which permit utilization of the local replica of the named object only by one single computer and each of the remainder of said plurality of computers is locked out of utilization of their corresponding local replica of the named object.

9. The plurality of computers as claimed in claim 8 wherein the local memory capacity allocated to each said application program is substantially identical and the total memory capacity available to each said application program is said allocated memory capacity.

10. The plurality of computers as claimed in claim 8 wherein all said distribution update means communicate via said communications link at a data transfer rate which is substantially less than the local memory read rate.

11. The plurality of computers as claimed in claim 8 wherein at least some of said computers are manufactured by different manufacturers and/or have different operating systems.

12. A method of running substantially simultaneously on a plurality of single computers interconnected via a communications network an application program written to operate only on a single computer, the application program having application program code including a plurality of code threads all intended to execute on and reference a single computer having a single processing unit or symmetric multiple processing units and a single independent local memory with a local memory capacity that is not shared with any other single computer of said plurality of single computers, said method comprising the steps of:
   (i) substantially simultaneously executing different portions of said application program on different ones of said plurality of single computers and for each said different portion creating a like plurality of substantially identical objects in each single independent local memory of the corresponding computer with a local memory capacity that is not shared with or accessible by any other single computer of said plurality of single computers such that all read requests by each single computer are satisfied from the local memory of the requesting computer and each object having a substantially identical name; and (ii) requiring any of said plurality of single computers wishing to utilize a named object stored in its single independent local memory to acquire an authorizing lock of the named object which permits said utilization and which prevents all the other plurality of single computers from utilizing their corresponding named object stored in their own single independent local memory until said authorizing lock of the named object is relinquished.

13. A method as claimed in claim 12 including the further step of:
(iii) providing each said computer with a distributed run time means to communicate between said computers via said communications network.

14. A method as claimed in claim 13 including the further step of:
(iv) providing a shared table accessible by each said distributed run time means and in which is stored the identity of any computer which currently has to access an object, together with the identity of the object.

15. A method as claimed in claim 14 including the further step of:
(v) associating a counter means with said shared table, said counter means storing a count of the number of said computers which seek access to said object.

16. A method as claimed in claim 15 including the further step of:
(vi) providing an additional computer on which said shared program does not run and which hosts said shared table and counter, said additional computer being connected to said communications network.

17. A method of ensuring consistent synchronization of an application program written to operate only on a single computer but different portions of which are to be executed substantially simultaneously each on a different one of a plurality of single computers interconnected via a communications network, the application program having application program code including a plurality of code threads all intended to execute on and reference a single computer having a single processing unit or symmetric multiple processing units and a single independent local memory with a local memory capacity that is not shared with any other single computer of said plurality of single computers, said method comprising the steps of:
(i) scrutinizing said application program at, or prior to, or after loading to detect each application program step defining a synchronization routine referencing an object in the application program, wherein for each said different portion of the application program a like plurality of substantially identical objects being created in each single independent local memory of the corresponding computer with a local memory capacity that is not shared with or accessible by any other single computer of said plurality of single computers such that all read requests by each single computer are satisfied from the local memory of the requesting computer and each object having a substantially identical name; and
(ii) modifying said synchronization routine to ensure utilization of said referenced object by only one of said single computers and preventing all the remaining computers from simultaneously utilizing their corresponding objects.

18. The method claimed in claim 17 wherein step (ii) comprises the steps of:
(iii) loading and executing said synchronization routine on one of said computers,
(iv) modifying said synchronization routine by said one computer, and
(v) transferring said modified synchronization routine to each of the remaining computers.

19. The method as claimed in claim 18 wherein said modified synchronization routine is supplied by said one computer direct to each of said remaining computers.

20. The method as claimed in claim 18 wherein said modified synchronization routine is supplied in cascade fashion from said one computer sequentially to each of said remaining computers.

21. The method claimed in claim 17 wherein step (ii) comprises the steps of:
(vi) loading and modifying said synchronization routine on one of said computers,
(vii) said one computer sending said unmodified synchronization routine to each of the remaining computers, and
(viii) each of said remaining computers modifying said synchronization routine after receipt of same.

22. The method claimed in claim 21 wherein said unmodified synchronization routine is supplied by said one computer directly to each of said remaining computers.

23. The method claimed in claim 21 wherein said unmodified synchronization routine is supplied in cascade fashion from said one computer sequentially to each of said remaining computers.

24. The method as claimed in claim 17 including the further step of:
(ix) modifying said application program utilizing a procedure selected from the group of procedures consisting of re-compilation at loading, pre-compilation prior to loading, compilation prior to loading, just-in-time compilation, and re-compilation after loading and before execution of the relevant portion of application program.

25. The method as claimed in claim 17 including the further step of:
(x) transferring the modified application program to all said computers utilizing a procedure selected from the group consisting of master/slave transfer, branched transfer and cascaded transfer.

26. In a multiple thread processing computer operation in which different individual threads of different portions of a single application program referencing objects are substantially simultaneously being processed each on a corresponding different one of a plurality of single computers interconnected via a communications link; a method comprising:
defining a memory structure in which said referenced objects are defined in an independent local memory of said single computer physically associated with the computer processing each said different thread and have corresponding objects in the local independent memory of each other of said plurality of single computers, the single independent local memory having a local memory capacity that is not shared with any other single computer of said plurality of single computers such that all read requests by each single computer are satisfied from the local memory of the requesting computer; and
permitting only one of said computers to utilize said referenced object and preventing all the remaining single computers from simultaneously utilizing their corresponding referenced object.

27. The improvement as claimed in claim 26 wherein an object residing in the memory associated with one said thread and to be utilized has its identity communicated by the computer of said one thread to a shared table accessible by all other said computers.

28. The improvement as claimed in claim 26 wherein an object residing in the memory associated with one said thread and to be utilized has its identity transmitted to the computer associated with another said thread and is transmitted thereby to a shared table accessible by all said other computers.

29. A computer program product comprising a set of program instructions stored in a storage medium and operable to permit a plurality of computers to carry out the method as claimed in claim 12 or 17.

30. A plurality of computers interconnected via a communication network and operable to ensure consistent synchronization of an application program written to operate only on a single computer but running substantially simultaneously on said computers, said computers being programmed to carry out the method as claimed in claim 12.

31. A plurality of computers interconnected via a communication network and operable to ensure consistent synchronization of an application program written to operate only on a single computer but running substantially simultaneously on said plurality of computers, said computers being programmed to carry out the method as claimed in claim 17.

32. A plurality of computers interconnected via a communication network and operable to ensure consistent synchronization of an application program written to operate only on a single computer but running substantially simultaneously on said plurality of computers, said plurality of computers being loaded with the computer program product as claimed in claim 29.

33. The system as in claim 1, further including means for eliminating clock cycle delays associated with one or said plurality of computers reading memory physically located in a different one or ones of the plurality of computers.

34. The system as claimed in claim 1, wherein:
the communications network comprises the Internet; and
each said computer includes a distributed run time means with the distributed run time means of each said computer configured to communicate over the Internet with all other computers so that if a portion of said application program(s) running on one of said computers requires the lock of an object in that computer then the need for the lock of the object is propagated by the distributed run time means of said one computer to all the other computers.

35. A method as claimed in claim 12, wherein:
the communications network comprises the Internet; and
each said computer includes a distributed run time means with the distributed run time means of each said computer configured to communicate over the Internet with all other computers so that if a portion of said application program(s) running on one of said computers requires the lock of an object in that computer then the need for the lock of the object is propagated by the distributed run time means of said one computer to all the other computers.

36. A method as claimed in claim 17, wherein:
the communications network comprises the Internet; and
each said computer includes a distributed run time means with the distributed run time means of each said computer configured to communicate over the Internet with all other computers so that if a portion of said application program(s) running on one of said computers requires the lock of an object in that computer then the need for the lock of the object is propagated by the distributed run time means of said one computer to all the other computers.

37. A improvement as claimed in claim 26, wherein:
the communications network comprises the Internet; and
each said computer includes a distributed run time means with the distributed run time means of each said computer configured to communicate over the Internet with all other computers so that if a portion of said application program(s) running on one of said computers requires the lock of an object in that computer then the need for the lock of the object is propagated by the distributed run time means of said one computer to all the other computers.

* * * * *